United States Patent
Perry

(10) Patent No.: US 11,557,066 B1
(45) Date of Patent: Jan. 17, 2023

(54) SYSTEMS AND METHODS FOR IMAGE TRANSFORMATION BASED ON API CALLS

(71) Applicant: Mitsubishi Electric Research Laboratories, Inc., Cambridge, MA (US)

(72) Inventor: Ron Perry, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/548,656

(22) Filed: Dec. 13, 2021

(51) Int. Cl.
| | |
|---|---|
| *G06T 11/00* | (2006.01) |
| *G06V 10/22* | (2022.01) |
| *G06T 3/40* | (2006.01) |
| *G06T 9/00* | (2006.01) |

(52) U.S. Cl.
CPC ............. *G06T 11/001* (2013.01); *G06T 3/40* (2013.01); *G06T 9/00* (2013.01); *G06V 10/22* (2022.01)

(58) Field of Classification Search
CPC ......... G06V 10/22; G06T 3/40; G06T 11/001; G06T 9/00
See application file for complete search history.

(56) References Cited

U.S. PATENT DOCUMENTS

| | | | |
|---|---|---|---|
| 2010/0164984 A1* | 7/2010 | Rane | H04N 1/32208 345/611 |
| 2017/0372457 A1* | 12/2017 | Sylvan | G06F 3/011 |
| 2019/0108657 A1* | 4/2019 | Petersen | G06T 11/001 |
| 2020/0184687 A1* | 6/2020 | Gueniot | G06T 11/001 |
| 2021/0012554 A1* | 1/2021 | Leonardi | G06T 9/00 |
| 2021/0049809 A1* | 2/2021 | Wahrenberg | G06T 3/00 |
| 2021/0106299 A1* | 4/2021 | Mao | A61B 6/504 |

* cited by examiner

*Primary Examiner* — Phi Hoang
(74) *Attorney, Agent, or Firm* — Gennadiy Vinokur; Hironori Tsukamoto

(57) ABSTRACT

A method and a system for processing an image and transform it into a high resolution and high-definition image using a computationally efficient image transformation procedure is provided. The transformation of the image comprises receiving an intensity image and generating an application programming interface (API) call for transforming the received intensity image. The API call is then transmitted to an image processing server for transforming the intensity image into a layered distance field (DF) image. Further, a response is received from the image processing server, wherein the response comprises one or more functions for obtaining the layered DF image.

14 Claims, 24 Drawing Sheets

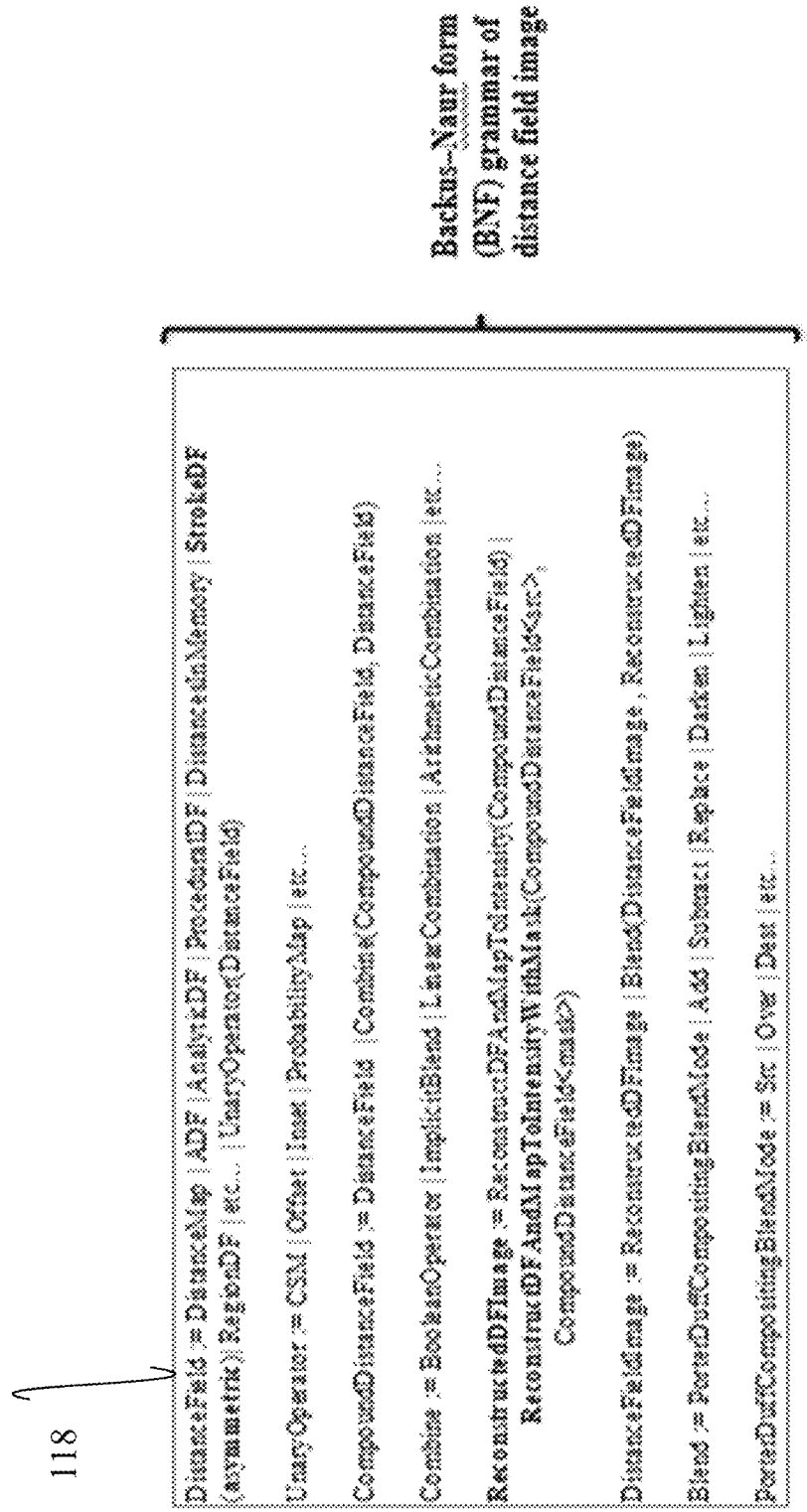
FIG. 1D (contd.)

US 11,557,066 B1

SYSTEMS AND METHODS FOR IMAGE TRANSFORMATION BASED ON API CALLS

TECHNICAL FIELD

The present disclosure relates generally to image processing, and more particularly to methods and systems for rendering of images using distance field procedures (DFPs).

BACKGROUND

The field of image processing and computer graphics has become all pervasive with billions of uses in daily lives. From navigation to shopping, from trains to cars, from infotainment/entertainment systems to medical equipment, image processing has found widespread use and application across various sectors. Specifically in the field of navigation technologies, high quality and high-definition map images have become need of the hour to show high resolution, clarity, and finer details in the map image, even after zooming, for efficient and safe navigation. Despite such prolific use, representation of images remains flawed with several disadvantages. Traditional approaches have tried to address this problem, but more competent approaches are required.

Another problem with processing of images is that even though images provide rich texture and detail, but they also require considerable space for storage. Also, when an image is transformed, such as zoomed and rotated, they exhibit various visual artifacts such as pixelization, excessive blurring, Moire patterns, jaggies. Further, images cannot provide suitable level of abstraction to convey various forms of information or when trying to edit a particular element.

To overcome this problem, one solution for reducing storage requirements for an image is representing images in Scalable Vector Graphics (SVG) format. SVG format is compact and can be scaled to any size without loss of quality but lacks the texture and richness of images. Thus, what is needed is a solution for representation of images can provides the richness of pixels in a full intensity image and the scalability and size of SVG format. Thus, even after having SVG format availability, a superior solution for image representation and processing is needed, which can offer richness of pixels with the artifact free transformations (i.e., resolution independence) and size of SVG format.

Another requirement in image processing is to provide a high quality in images, which can provide as much detail of images as possible, without consuming too much processing power and storage. Some existing graphics processing applications are based on calculation of distance fields for 2-Dimensional (2D) images/shapes. A distance field of an object represents, for any point in space, a distance from the point to a boundary of the object. The distance chosen in many applications is often a minimum distance from the point to the boundary of the object. The 2D distance field of a shape represents, for any point P in space, the signed minimum distance from P to the boundary (i.e., outline) of the shape. A signed distance can be used to distinguish between an inside and outside of the object (e.g., a negative distance would indicate the point is outside the object while a positive distance would indicate the point is inside the object). Metrics used to measure distance can take on many forms, but Euclidean distance is frequently favored because of its utility in a number of applications such as collision detection and rendering. 2D distance fields are used to represent many details of the 2D shape, such as exterior of the shape, interior of the shape, an outline of the shape, and a number of offset surfaces.

Such distance fields-based representations of 2D shapes and objects have several advantages over more traditional geometric methods for representing objects and have been used successfully in many domains including computer aided design, medical imaging, surgical simulation, font rendering, games, movie production, deformation modeling, fluid simulation, and robotics.

Distance fields also offer gains in efficiency and quality because distance fields vary smoothly ($C^0$ continuous) and throughout space. In terms of computational efficiency, distance fields are operated with simple and fast Boolean operations including, but not limited to, union, difference, and intersection. Moreover, distance fields also offer fast and simple offsetting, easier to compute blends, smooth reconstruction of edges in shapes, easier collision detection, and fast geometric queries. However, distance fields are represented using analytic representations, which can sometimes be complex to determine for complex shapes.

Another representation associated with 2D distance fields is a distance map, which is a regularly sampled map of distance fields for various points in the plane representing a 2D shape. Distance maps are obtained by sampling the shape at remarkably high rates in order to capture all minute details of the shapes, such as corners and Voronoi region boundaries.

According to yet another representation, Adaptively Sampled Distance Fields (ADFs) may be used for performing detail-directed sampling of distance fields in a shape, and then reconstructing distance fields from these adaptively sampled points. Such ADFs may include such as a bilinear cell ADF representation, a barycentric cell ADF representation, a biquadratic cell ADF representation, and the like. Along with rendering of the image using ADF, anti-aliasing is used to estimate intensity at every pixel of the shape. However, thus far, performance of ADFs has been limited to primitives rendering, such as rendering of fonts and glyphs. Procedural ADF is primarily based on the technology of distance fields, which is used for transformation from a set of curves representing a shape, such as a character in a font, to an equivalent set of distance fields that helps to provide improved performance and quality in processing tasks related to such set of curves and/or fonts, where the processing tasks include such as collision detection, selection, animation, blending, tuning, and editing. Using ADFs in this manner, shapes and fonts may be rendered suitably, but their use for rendering of high-definition images is not known.

In some approaches, distance based anti-aliasing is used for rendering the shape or font. Distance based anti-aliasing offers better performance than traditional anti-aliasing because in this case distance field varies smoothly. Also, distance field of a moving shape, such as a font or glyph, does not change much from frame to frame, so distance field based anti-aliasing provides superior quality from frame to frame on rendering, even for moving fonts or glyphs. Another feature of distance based anti-aliasing approach is that it offers continuous stroke modulation (CSM) by providing a continuous range of stroke weights and edge sharpness settings. However, this approach also suffers from a disadvantage, that CSM becomes overly complex to implement if the underlying shape has a complex topology change.

Accordingly, there is a need for an efficient system for rendering of high intensity and meticulous images, with higher processing efficiency and lower storage requirements, which can overcome the shortcomings of the approaches discussed above.

SUMMARY

There are many approaches that are known for processing of 2D shapes and fonts, such as those discussed above. But processing of high intensity and high-definition images is mostly computationally expensive and requires a lot of memory too. One of these approaches is distance fields, which is a mature technology for graphic representations. Distance field technology uses metrics, such as Euclidean distance to measure distance, because of its utility in many applications such as collision detection and rendering. Distance fields have several advantages over more traditional geometric methods for representing objects and have been used successfully in many domains including computer-aided design, medical imaging, surgical simulation, font rendering, games, movie production, deformation modeling, fluid simulation, and robotics. Distance fields are a specific example of implicit functions, which have a long history of use and study.

Various embodiments disclosed herein provide different forms of distance field representations, including detail directed distance fields, regularly sampled distance fields, procedural distance fields, analytic distance fields, distances stored in a memory, and the like. To that end, distance fields can also be derived from geometric primitives such strokes, filled regions, textured regions, and the like.

Some embodiments are based on the realization that a distance field rendering pipeline may be used to visualize the object. The distance field rendering pipeline can be defined as: given a known geometry of the object, compute distance field representing that geometry, and then map the computed distance field to pixels of an image. Indeed, different pixels in the image would have different distances to the surface of the object, and, thus, their intensities can be estimated as a function of distance values. In other words, the distance values can be mapped to the intensity values. One simple example of such a mapping is to make pixels at locations with negative distance values bright and positive distance values dark. As previously stated, the negative distance would correspond to pixels inside the object and the positive distance would correspond to the pixels outside of the object, so such a mapping may be used to visualize a bright representation of the shape of the object on the dark background.

Some embodiments are based on the realization that the distance field rendering pipeline can be used to visualize not only complete geometrical shapes but also geometrical primitives forming various kinds of shapes. For example, the geometric primitives, such as curves, may be first transformed to distance fields and then mapped to pixels and their corresponding intensity values to render and view the geometric primitives on a display. In addition to intensity estimation, the mapping may be used to perform various functions such as antialiasing, colorization, and the like. Additionally or alternatively, the geometric primitives converted to distance fields may be queried to perform various functions such as collision detection, selection, path planning, and the like. The results of these operations may also be rendered on a display device, in accordance with some embodiments.

Some embodiments are based on the realization that the distance field rendering pipeline may be reversed, and the distance fields may be computed from an intensity image, i.e., in a direction opposite to the direction of the current rendering pipeline. For example, some embodiments disclose methods and systems for representing intensities of a rich texture image as a set of distance fields. To that end, such a reversed rendering requires finding a hypothetical shape having such distance fields that the visualization of values of these distance fields would produce an original intensity image. Therefore, it is an object of some embodiments to provide methods and systems for implementing such reverse rendering pipeline using distance fields to provide the advantages of distance fields discussed above and use them for processing of high intensity images.

Further, some embodiments disclose methods and systems that may provide the richness of intensity pixels with the artifact-free transformations (i.e., resolution independence) and the size of SVG format. These methods and systems may be used in various applications such as surgical planning, data compression, texture mapping, and surveillance.

Various embodiments disclosed herein provide a reverse rendering pipeline based on replacing of intensity images with a distance field (DF) based solution that solves a host of technical problems including, but not limited to: eliminating visual artifacts (e.g., pixelization, Moire patterns, excessive blurring, jaggies) present in images during viewing transformations, reducing storage requirements, reducing memory and processing requirements inherent in images by being adaptive to content complexity, and providing fast high-quality progressive viewing over a slow network. To that end, the various embodiments disclosed herein provide, unlike the prior art, good compression, and ability to be operated on directly (e.g., rendered directly, queried directly) without performing a decompression step.

To that end, it is an object of some embodiments to provide a system and a method to convert image intensities into the DF representation. Additionally or alternatively, it is an object of some embodiments to provide a structure of a DF representation of intensities of an image that upon reconstruction would render the distance fields to represent an original image with a target accuracy. It is often the case in computer science and its numerous applications that changing the representation of an object from one form to another can enable and significantly improve a solution to a host of technical problems pertaining to the object. This technique is referred to herein as a "transform and conquer" technique. Although this transform and conquer technique has been applied to geometry and distance fields in various domains such as font rendering, it has yet to be applied to intensity images and distance fields. One of the reasons for such a deficiency is the complexity of such a transformation.

Some embodiments are based on a recognition that it can be advantageous to provide an optimization procedure that searches for the best DF representation of the intensities of the image while optimizing some optimization parameters, so that the complexity of the overall transformation described above can be reduced.

To that end, an example of the optimization parameters can be the minimization of a visualization error, e.g., a distance between the original image and the image reconstructed from the distance fields. However, considering the complexity of the intensities to distance field transformation, such optimization is challenging and is difficult to converge. To address this problem, some embodiments are based on a manner in which an actual painting process takes place. For example, if one looks at any intensity image, each pixel has its final intensity and/or color regardless of the manner of how an artist arrived at this intensity. However, during a painting process, an artist may not draw a point with its final intensity at once but may add layers upon layers of paint of different intensities/colors such that an ordered combination of layers of paint would result in the final intensity/color at each location of the painting. As a result, each rich intensity image can be viewed not as a two-dimensional (2D) image of intensities, but as a 3D image of layers of intensities, i.e., layers of 2D images, that in combination results in the desired image.

To that end, various embodiments provide methods and systems to apply transform and conquer technique to intensity images to transform an intensity image of any complexity into a layered distance field image. Each layer of the layered distance field image includes a distance field procedure defining distance field values at all locations of the intensity image and rules for mapping these distance field values into intensity values. In addition, the layered distance field image includes information of an order for combining different layers, such that an intensity image reconstructed from the layers of the layered distance field image approximates an original intensity image.

Some embodiments provide a method, a system, and an apparatus for image processing. The method, the system and the apparatus are based on transformation of an intensity image, such as a high detail, high-definition, rich texture image, into a layered DF image. The layered DF image is obtained by performing DF transformation on the intensity image in a layer-by-layer manner so as to simplify processing and reducing memory and computational requirements of the overall system, and at the same time achieving a desired level of performance. The layers are obtained in an ordered sequence, with each layer in the sequence being associated with a DF procedure for defining DF values at a plurality of locations of the intensity image; and a set of rules for mapping the DF values to intensity values of the respective layer. The layer-by-layer transformation performed in this manner yields a layered DF image, which is then rendered to obtain a superior quality intensity image. The layer-by-layer transformation achieves the objective of reversing the rendering pipeline and providing a high-quality image as output, with rich details and texture.

Some embodiments are based on the recognition that each of the plurality of locations in the intensity image can be represented by a respective candidate region of a plurality of candidate regions in the intensity image.

Some embodiments provide an intensity reconstruction function for combining mapped intensities of each layer according to their order in the sequence of layers to reconstruct the intensity image.

Some embodiments provide determination of an error value associated with a difference between intensities of the original or received intensity image and an intensity image reconstructed from the layered DF image. The error value is then compared with a threshold error value. The comparison is then used to either continue layered transformation or stop the process of transformation and update the reconstructed image accordingly.

Various embodiments disclose a Backus-Naur Form (BNF) grammar which describes a plurality of operations for each layer in the layered DF transformation.

Some embodiments are based on the realization that layered DF transformation may be used to replicate asymmetric strokes of painting process by defining asymmetric stroke procedures. This is done to ensure optimality of the image conversion process, which in turn makes the overall image conversion process computing efficient and convergent. Various embodiments provide resolution independent intensity image reconstruction.

Various embodiments provide the distance field operations comprising one or more of: a distance map operation, an adaptive distance field calculation operation, an analytic distance field calculation operation, a procedural distance field calculation operation, a distance in a memory distance field calculation operation, a stroke distance field calculation operation, a regional distance field calculation operation, and a unary operator on distance field calculation operation.

Some embodiments are based on the recognition that a DF procedure may comprise an asymmetric stroke procedure associated with a spline curve, wherein the spline curve is associated with a corresponding distance field, and wherein the asymmetric stroke defines a rule for mapping the distance field of the spline curve to a different gradient of intensity change on different sides of a central axis of the spline curve such that intensities of the spline curve vary in a direction perpendicular to its central axis.

Various embodiments provide DF procedures including a DF visualized with masked gradual intensities, wherein masked gradual intensities comprise null intensity values at specific locations of the layered DF image.

Some embodiments are further based on the recognition that different layers of the layered DF image represent elements corresponding to different resolutions of the received intensity image.

Some embodiments provide an image processing system comprising an input interface configured to receive an intensity image. The image processing system further comprising at least one processor configured to execute computer-executable instructions to generate an application programming interface (API) call for transforming the received intensity image. The API call being transmitted to an image processing server for transforming the intensity image into a layered distance field (DF) image, wherein the layered DF image comprises an ordered sequence of multiple layers. Each layer in the ordered sequence comprising a DF procedure for defining DF values at a plurality of locations of the received intensity image and a set of rules for mapping the DF values to intensity values of the respective layer. The image processing system further comprising instructions configured to receive a response from the image processing server, wherein the response comprises one or more functions for obtaining the layered DF image, such that the layered DF image is obtained by transforming intensity image. The layered DF image is then rendered on an output interface.

Some embodiments provide the one or more functions including an intensity reconstruction function for combining mapped intensities of each layer according to their order in the sequence of layers to reconstruct the received intensity image after transformation.

Various embodiments further provide determining an error value associated with a difference between intensities of the received intensity image and an intensity image reconstructed from the layered DF image. Further the error value is compared with a threshold error value and the reconstructed intensity image is updated based on the comparison.

Some embodiments provide the API call comprising a transformation instruction to transform the layered DF image based on the transformation instruction.

Some embodiments provide the API call comprising a pen-type data for defining an asymmetric stroke procedure. The pen-type data comprises at least: a pin stroke pen-type option, a pressure-sensitive pen-type option, a customizable pen-type option, a scalable pen-type option, and a textured pen-type option.

Some embodiments provide a method for image processing based on API calls. The method comprising receiving an intensity image and generating an API call for transforming the received intensity image. The API call is then transmitted to an image processing server for transforming the intensity image into a layered distance field (DF) image, wherein the layered DF image comprises an ordered sequence of multiple layers and each layer in the ordered sequence comprises: a DF procedure for defining DF values at a plurality of locations of the received intensity image and a set of rules for mapping the DF values to intensity values of the respective layer. The method further comprising receiving a response from the image processing server, wherein the response comprises the layered DF image, such that the layered DF image is obtained by transforming intensity image and rendering the layered DF image.

Accordingly, the various embodiments disclosed herein provide for an efficient, resolution independent and adaptive techniques for processing and transforming of images, to provide rich texture, high-definition, highly detailed and less memory intensive rendering on images, based on DF technology. Various embodiments also disclose more intuitive and painting like experience for rendering high-quality images, with possibility of having infinite zoom and resolution-based rendering.

DETAILED DESCRIPTION

Figure 1A:
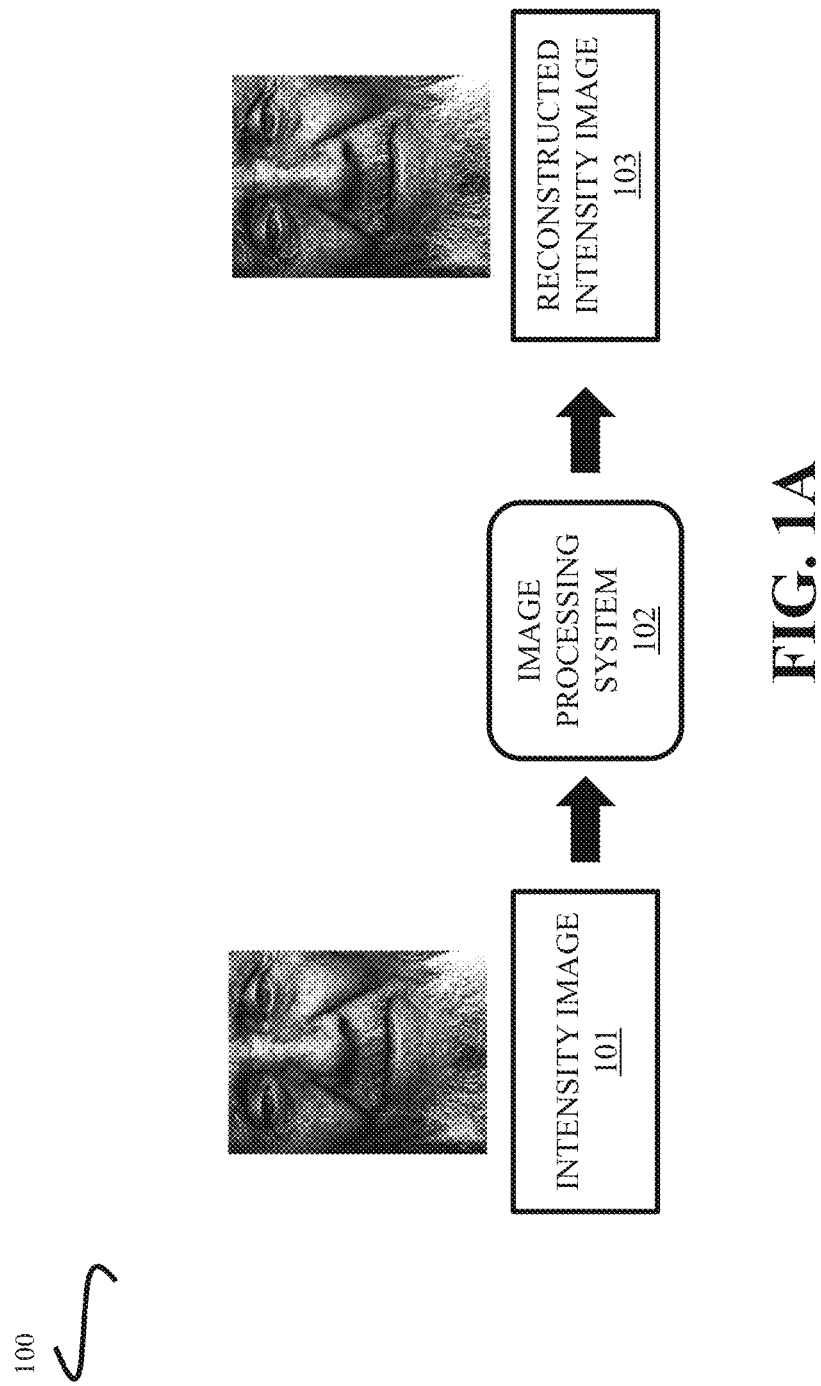
FIG. 1A illustrates a block diagram showing an image processing system, according to some embodiments of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Various embodiments disclosed herein provide a novel approach for digital drawing which allows the creation of detailed and textured artwork, having artifact-free scalability and small memory footprint.

Some embodiments disclosed herein provide a method, a system, and a computer-program product for image processing. The image processing disclosed in various embodiments provides several advantages over the existing solutions known in the art. These various advantages include such as the ability to create graphical elements that exhibit the richness of pixels with the artifact-free scalability and small size of SVG image format. The image processing methods and systems disclosed herein provide a perception for a user, such as an artiste, a developer, a media editor, an engineer, an animator, and the like to be able to work on an infinite canvas in both spatial (x and y) extent and scale (z) thereby providing seamless infinite zoom and infinite definition capabilities, which is not available in any other system known in the existing art.

Various embodiments also provide an efficient and effective solution for memory-limited and bandwidth-limited environments by reducing memory storage requirements for image processing. Another advantage of the methods and systems disclosed herein is that images may be made highly tunable by providing distance-based anti-aliased rendering capabilities while processing of the images. Further, the capabilities disclosed in various embodiments provided herein also include support for a wealth of primitives such as variable width textured strokes with intricate sub-pixel features and supporting real-time fast rendering of the images by enabling immediate feedback during drawing and interactive canvas transformations.

Some embodiments also provide methods and systems for enabling stylization for different looks and levels of abstraction in the images obtained by distance field-based reconstruction and rendering, which may also be easily integrated with distance field-based font rendering. Thus, various embodiments may provide intuitive content creation by developing images layer by layer, just like real-world painting experience, providing a superior drawing like experience for users, such as content creators.

Some embodiments are based on the realization that distance field based rendering may provide an unprecedented ability to represent geometry of any dimension, in a purely procedural resolution independent manner, comprised of both smooth and sharp features, through the use of simple and very efficient Boolean, blending, offsetting, and arithmetic operations unique to distance fields, doing so with less memory, greater accuracy, higher quality, and a smaller computational burden than other technologies known in the art. The modeled geometry may thus be real, derived, or simulated.

The methods and systems disclosed herein are based on distance field technology and its application in layered manner and may be used in a plurality of applications including but not limited to medical applications, geographic information systems, gaining systems, entertainment systems, maps and navigation, compression technologies, UI design, video encoding, animation generation, video editing, and the like.

FIG. 1A illustrates a schematic diagram 100 showing an image processing system 102, according to some embodiments of the present disclosure. The image processing system 102 is configured to receive an intensity image 101 and transform the received intensity image 101 into a reconstructed intensity image 103.

The intensity image 101 may be any image which has high detail, high definition, information about various channels, a primitive image, a geometric object, a font, and the like. For example, the intensity image 101 may be a representation including a set of spatially coherent pixels, a distributed amplitude of colors, like a JPEG or a PNG image, a set of colors and corresponding locations and the like. The representation of pixels can be procedural in nature, discrete in nature or and continuous in nature, and have associated with the image, spatially related or temporally related set of values. The intensity image 101 may also have associated with it, a sampling mechanism or a process that can produce a related set of values, which may be 2D or 3D.

To that end, the intensity image 101 could be an image used in any of the applications such as video editing, UI design, animation, maps used in navigation, entertainment related applications, digital TV, images used in transportation systems such as trains, images used in building facilities such as elevators, or any other application having an associated display screen for viewing the intensity image 101 or the reconstructed intensity image 103.

For the transformation of the intensity image 101, the image processing system 102 uses layered DF transformations for transforming the received intensity image 101, layer-by-layer, into a layered DF image, which is then used to reconstruct an image for rendering. This image for rendering is the reconstructed intensity image 103, which may then be rendered on an output interface.

The reconstructed intensity image 103 has better definition and visual quality, as compared to the received intensity image 101, and is also compressed in size, leading to overall quality improvement in the received intensity image 101, and better storage characteristics. This is achieved due to performance improvement provided by layered DF transformations executed by the image processing system 102. The details of the image processing system 102 are illustrated in FIG. 1B.

Figure 1B:
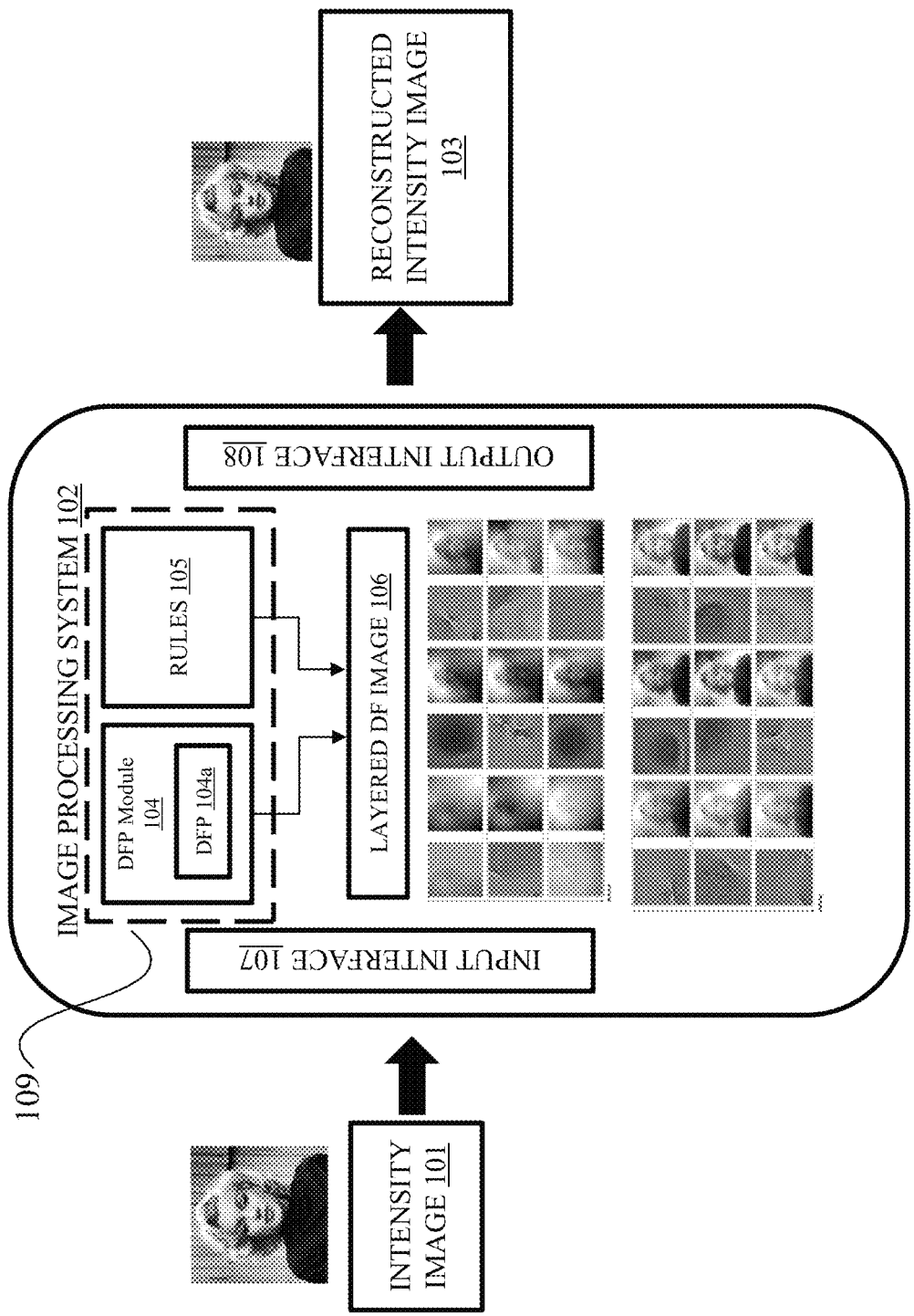
FIG. 1B illustrates a schematic diagram showing the image processing system of FIG. 1A configured for layered DF image transformation, according to some embodiments of the present disclosure.

FIG. 1B illustrates a detailed schematic diagram showing the image processing system 102 of FIG. 1A configured for layered DF image transformation, according to some embodiments of the present disclosure. The image processing system 102 may be implemented as a computing system. The computing system comprises an input interface 107 that is configured to receive the intensity image 101. The input interface 107 may be configured to receive any input from input devices and/or techniques known in the art, including, but not limited to: a keyboard input, a touch-based input, a mouse-based input, an input submission by uploading the intensity image from a second computing system, an upload of the intensity image 101 from the same computing system, and the like.

The received intensity image 101 is then passed to at least one processor, such as processor 109 shown in FIG. 1B. The processor 109 is configured to execute computer-executable instructions that may be stored in a memory or in a computer-readable storage medium. The computer-executable instructions to may in turn be configured to execute various operations for transformation of the intensity image 101 to the reconstructed intensity image 103 based on layered DF calculations performed by a combination of a DF procedure (DFP) module 104 and a rules module 105. The operations of the DFP module 104 and the rules module 105 may transform the intensity image 101 into a layered DF image 106, as shown in FIG. 1B. Each layer in the layered DF image 106 is an ordered layer in an ordered sequence of multiple layers. The ordered sequence of multiple layers enables a step-by-step refinement of the intensity image 101, by breaking down the overall computing task of image transformation into smaller manageable chunks of image processing and leading to a step by step or layer by layer compression of the layered DF image 106 as well. This makes the overall image processing task computationally feasible, less complex, and memory-efficient, and at the same time, rendering images with elevated level of detail by successively increasing the level of detail with each layered transformation step.

Each layer in the ordered sequence has its own associated DFP 104a provided by the DFP module 104. The DFP 104a causes the image to be represented by defining DF values of a plurality of locations the received intensity image 101. The DF values may then be mapped to corresponding intensity values for that respective layer, by a set of rules provided by the rules module 105.

To that end, each DFP 104a and its associated rules 105, are configured to directly model and approximate the luminance and chrominance channels of an image, such as a layered image in the sequence of layers. The original channels of the image, such as RGB and CMYK, can be first converted to other forms and other color models such as LUV and LAB to enable faster, simpler, and better convergence in matching the set of DFPs to the image. In one embodiment of the invention wherein the image is 2D, the image is viewed as a raw 2D distance field and the inverse of the traditional distance field rendering pipeline (i.e., given a known 1D geometry, compute a 2D distance field, map the 2D distance field to pixels) is being determined (i.e., given a 2D distance field, find the generating unknown 1D geometry which when combined matches the 2D distance field). This reduces the dimensionality of the problem from two to one when the image is two dimensional, thereby providing a significant advantage over other methods in terms of computational complexity. The one-dimensional problem can be solved with one dimensional methods that are faster, simpler, and which have better convergence properties. Such conversions are implemented layer-by-layer, on each layered DF image obtained in a layer.

The layer-by-layer transformation in this manner is performed until a stopping criteria for transformation is met. The stopping criteria may be defined by a plurality of factors, including but not limited to level of detail, an error value minimization, a target compression value, and the like.

Once layered transformations in this manner are completed, the layered DF image 106 obtained at the last step of transformation is sent to an output interface 108. The output interface 108 may be configured to render the layered DF image 106. This rendered DF image 106 may be viewed as the reconstructed intensity image 103, using a display or viewing technology associated with the output interface 108. For example, the output interface 108 may provide a display of the reconstructed intensity image 103 in a map-based application, in an entertainment application, in a transport system display, a display in a factory automation setting and the like. The use of distance field calculations for transformation of the received intensity image 101 into the layered DF image 106, which is then rendered as the reconstructed intensity image 103 in many applications, is advantageous due to some of the reasons described above. Therefore, the present disclosure makes extensive usage of DF calculations for image processing. Some considerations and explanations related to DF calculations are described next in association with FIG. 1C.

Figure 1C:
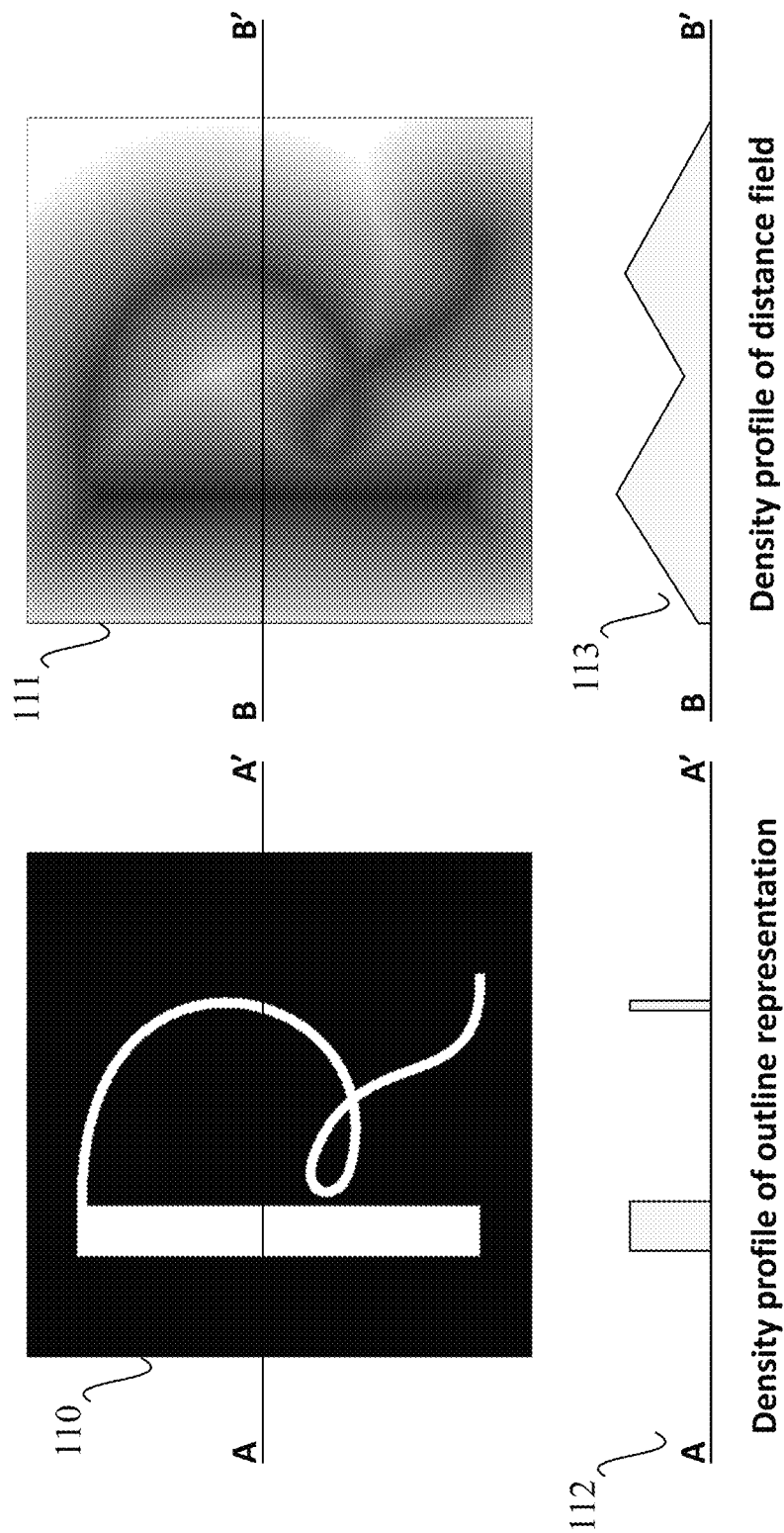
FIG. 1C illustrates a schematic diagram showing distance fields and density profile variations for a shape, according to some embodiments of the present disclosure.

FIG. 1C illustrates a schematic diagram showing DF calculations and density profile variations for a shape, according to some embodiments of the present disclosure. FIG. 1C illustrates an object 110, such as a shape or a font, and its corresponding DF representation 111. For example purposes, FIG. 1C shows a 2D object. However, the concepts illustrated herein may be applicable to 3D objects as well, without deviation from the scope of the present disclosure. FIG. 1C also shows a variation in density profiles for the object 110 and its DF representation 111. Density profile 112 represents density profile of the object 110 along an axis defined by line AA', and density profile 113 represents density profile of the DF representation 111 of the object 110 along an axis defined by line BB'.

As already known, a distance field of an object represents, for any point in space, a distance from the point to a boundary of the object (such as for the object 110). The distance chosen in many applications is often a minimum distance from the point to the boundary of the object. A signed distance can be used to distinguish between an inside and outside of the object (e.g., a negative distance would indicate the point is outside the object while a positive distance would indicate the point is inside the object).

Alternately or additionally, the distance from the point to the boundary of the object is replaced by a vector emanating from the point and when followed leads to a closest location on the boundary of the object. Metrics used to measure distance can take on many forms, such as a Euclidean distance form.

To that end, to represent the object 110 its DF 111, a variety of ways may be used, such as detail directed distance fields, regularly sampled distance fields, procedural distance fields, analytic distance fields, distances stored in a memory, distances derived from geometric primitives such strokes, filled regions, textured regions, and the like. DF representations 111 based on procedural distance fields use a DFP (such as DFP 104), that includes a set of distance fields and a set of operations that act on the set of distance fields.

To that end, each DFP 104 executed by the DFP module distance field procedures, to directly model and approximate the luminance and chrominance channels of an image, to name just one example. The original channels of the image, such as RGB and CMYK, can be first converted to other forms and other color models such as LUV and LAB to enable faster, simpler, and better convergence in matching the set of distance field procedures to the image. In one embodiment of the invention wherein the image is 2D, the image is viewed as a raw 2D distance field and the inverse of the traditional distance field rendering pipeline (i.e., given known 1D geometry, compute a 2D distance field, map the 2D distance field to pixels) is being determined (i.e., given a 2D distance field, find the generating unknown 1D geometry which when combined matches the 2D distance field). This reduces the dimensionality of the problem from two to one when the image is two dimensional, thereby providing a significant advantage over other methods. The one-dimensional problem can be solved with one dimensional methods that are faster, simpler, and which have better convergence properties.

Figure 1D:
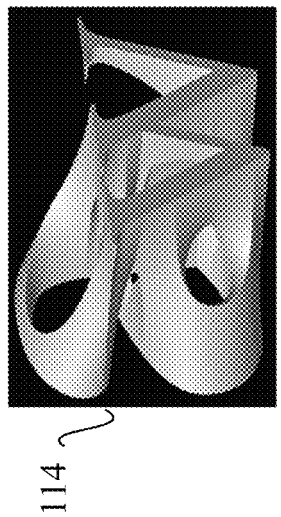
FIG. 1D illustrates a schematic diagram showing various operations performed on the distance fields for combination of distance fields, according to some embodiments of the present disclosure.
Figure 1D:
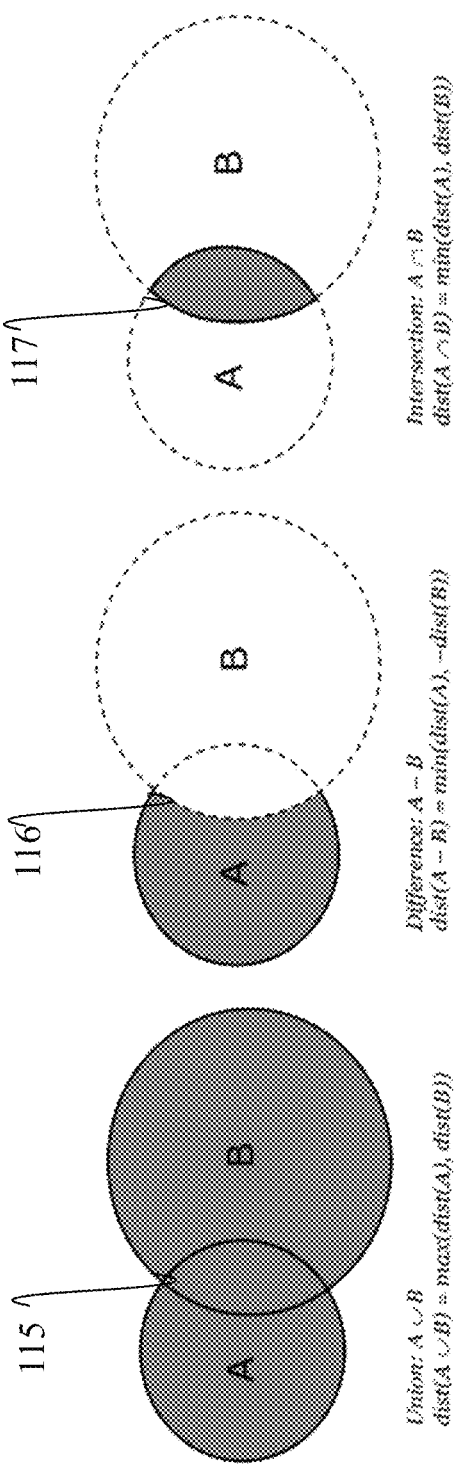

FIG. 1D illustrates a schematic diagram showing various operations performed on the distance fields for combination of distance fields, according to some embodiments of the present disclosure.

As illustrated in FIG. 1D, various operations in the set of operations include Boolean combinations of distance fields. For example, one operation may be blending of distance fields 114, another operation may be a union operation 115, another may be a difference operation 116, yet another may be an intersection operation 117. All these operations may be quite easy to compute using distance fields.

For example, the blending of distance fields 114 shows a blend between two different fonts, a Palatino "a" and a Times New Roman "W". This is difficult to compute using other image processing techniques, but straightforward with distance fields. Similarly, other operations are also very straightforward. For example, the union operation may be 115 be given as:

Union: $A \cup B \Rightarrow dist(A \cup B) = max(dist(A), dist(B))$
The difference operation may be 116 be given as:
Difference: $A-B \Rightarrow dist(A-B) = min(dist(A), -dist(B))$
The intersection operation may be 117 be given as:
Intersection: $A \cap B \Rightarrow dist(A \cap B) = min(dist(A), dist(B))$ Similarly, many other operations may be defined, including but not limited to offsetting of distance fields, arithmetic combinations of distance fields, unary operations on distance fields, conditional operations on distance fields, logical operation on distance fields, masking operations on distance fields, and the like. Masking operations on distance fields define a region of the image which prevents the region from change when performing operations on the image in the region, wherein the region is defined by a set of distance field procedures, wherein the set of distance field procedures are resolution independent. The mask may be binary or continuous.

The operations in the set of operations are not limited to distance field operations and also include image processing operations, computer graphics operations, signal processing operations, and the like. The distance fields provide distinct computational advantages when performing various operations such as blending, offsetting, rendering, and determining composite shapes from Boolean operations. Further distance field procedures, such as DFP 104, when evaluated, can take on both positive and negative values thereby enabling a wide range of applications such as modeling brushes, pens, erasers, and the like in a digital drawing system. Additionally, Boolean combinations of DFs may be used to capture sharp discontinuous features in images, arithmetic (e.g., linear) combinations of DFs may be used to capture smooth regions in images, implicit blends may be defined for smoothly combining DFs, offsets may allow easy feature fitting and sizing of candidate DFs. Further, DF primitives may be tuned using correspondences by Sensitivity to Movement (CSM) algorithm. Further, procedural masking may enable more efficient representations of images and several procedural DF-based templates may be provided for modeling texture. Another advantage of using DF procedures is that they enable massive parallelism of operations.

Some embodiments also provide various operations for DF calculations defined by a Backus-Naur form (BNF) of grammar 118. To that end, each layered DF image is associated with the BNF grammar 118, wherein the BNF grammar 118 of a structure of each of the layered DF image comprises a plurality of operations including at least one of: a distance field operation, a unary operator operation, a compound distance field calculation operation, a combine operation, a DF image reconstruction operation, a DF image generation operation, a blend operation, a porter duff compositing blend operation, and the like.

The distance field operation comprises at least one of: a distance field map operation, an adaptive distance field calculation operation, an analytic distance field calculation operation, a procedural distance field calculation operation, a distance in the memory distance field calculation operation, a stroke distance field calculation operation, a regional distance field calculation operation, and a unary operator on distance field calculation operation.

The unary operation comprises at least one of: a CSM operation, an offset operation, an inset operation, and a probability map calculation operation.

The compound distance field calculation operation comprises at least one of: a distance field calculation operation and a combine operation. The combine operation comprises at least one of: a Boolean operation, an implicit blend operation, a linear combination operation, and an arithmetic combination operation.

The DF image reconstruction operation comprises at least one of: a DF and map to intensity operation and a DF and map to intensity with mask operation. The DF image generation operation comprises at least one of: a reconstruct DF operation and a blend operation.

The blend operation comprises at least one of: an addition operation, a subtraction operation, a replace operation, a darken operation, a lighten operation and a porter duff compositing blend operation. The porter duff compositing blend operation comprises at least one of: a src operation, an over operation, and a dest operation. The combinations of various operations in suitable manner may be used to achieve a layered DF image for a corresponding layer. The refinement of layered DF images in a successive manner, until the stopping condition is met, is then used to reconstruct the intensity image for better quality, high definition, and better resolution.

Figure 1E:
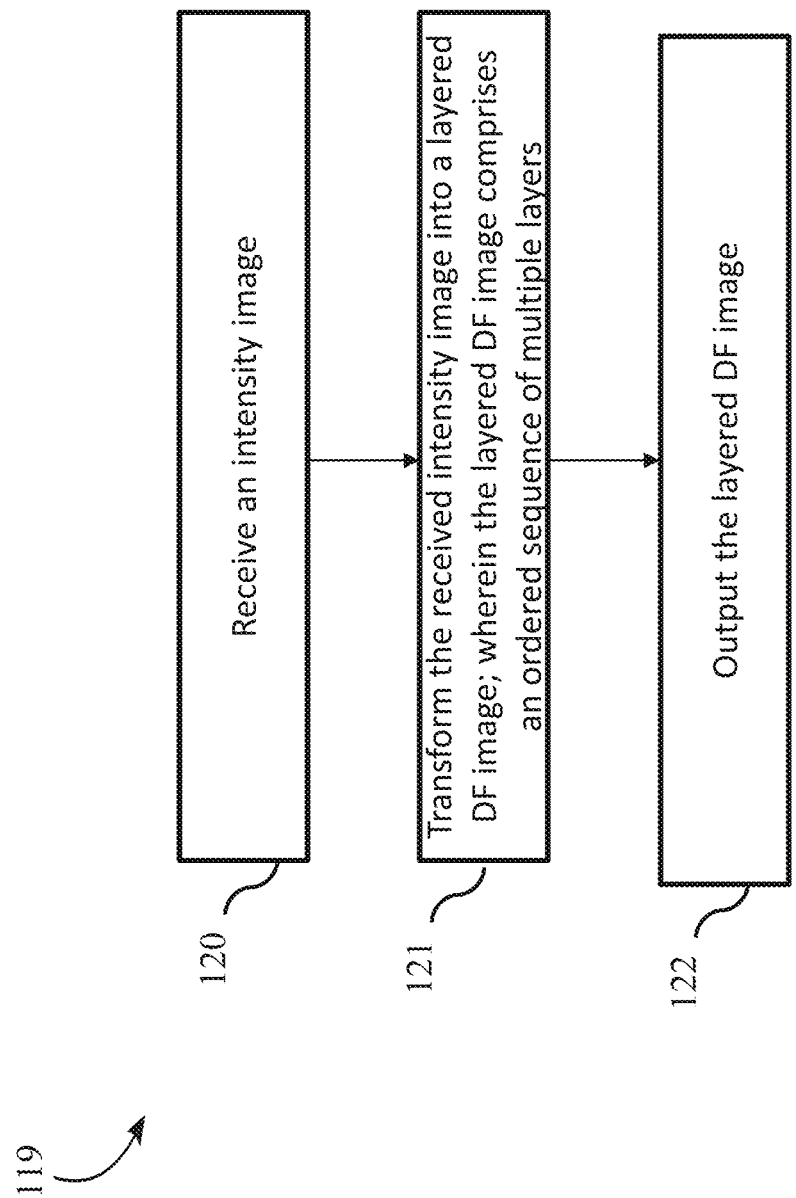
FIG. 1E illustrates a flow diagram of a method for image processing based on layered DF transformation of an intensity image, according to some embodiments of the present disclosure.

FIG. 1E illustrates a flow diagram of a method 119 for image processing based on layered DF transformation of the intensity image 101, according to some embodiments of the present disclosure.

The method 119 includes, at step 120 receiving the intensity image 101. The intensity image 101 may be received at the input interface 107 of the image processing system 102 from an image processing related application.

Then, at step 121, the received intensity image is transformed into the layered DF image. The layered DF image comprises an ordered sequence of multiple layers, with each layer having a level of refinement better than a previous layer. Further, as disclosed earlier, each layer in the ordered sequence is associated with a DF procedure, like DFP 104*a*, for defining DF values at a plurality of locations of the received intensity image 101; and a set of rules, like rules provided in rules module 105, for mapping the DF values to intensity values of the respective layer. To that end, the ordered sequence of multiple layers in the layered DF image may be associated with a recursion of DFPs. Each layer may be associated with a different DFP, which may be selected from at least one of: a parameterized DF procedure, an analytic DF procedure, and a sampled DF procedure, and an asymmetric stroke procedure associated with a spline curve.

The asymmetric stroke procedure comprises an asymmetric stroke defining a rule for mapping the distance field of the spline curve to a different gradient of intensity change on different sides of a central axis of the spline curve such that intensities of the spline curve vary in a direction perpendicular to its central axis. These intensities of the spline curve may vary gradually and are different at different sides of a central axis of the spline curve. In some embodiments, the spline curve may be shifted with respect to the central axis. The use of an asymmetric stroke procedure in layered transformation enables a more intuitive and computationally convergent solution to image processing and transformation problem, which resembles real-world painting process.

Another type of computationally efficient DFP may include a DF visualized with masked gradual intensities, wherein masked gradual intensities comprise null intensity values at specific locations of the layered DF image. As a result of null intensity values, at a layer of the layered DF image do not modify the intensities of the previous layers at corresponding locations, and thus lesser computations are performed for executing the overall DFP.

Some embodiments are based on the recognition that different layers of the layered DF image 106 represent elements corresponding to different resolutions of the received intensity image. Therefore, layered DF transformation achieved by the method 119 (and by image processing system 102) provides a resolution independent way to perform image transformation. This is because each subset of DFPs selected from the beginning of the ordered sequence of DFPs reconstructs the received intensity image 101 at different resolutions but with the same bound on a reconstruction error. The reconstruction error will be discussed later in conjunction with FIGS. 2C and 2D.

Additionally, each layered DF image may be subjected to a multiscale normalization that iteratively estimates each layer of the layered DF image by varying optimization parameters at different iterations.

Such successive iterations to transform DF images between different layers is done, until a stopping condition is met. The stopping condition will be discussed later in conjunction with FIGS. 2C and 2D.

Finally, at step 122, the final layered DF image of the layer where the successive transformation stopped, is used as an output layered DF image for rendering on an output interface. This image is then rendered as the reconstructed intensity image 103. To that end, the layered DF image includes an intensity reconstruction function for combining mapped intensities of each layer according to their order in the sequence of layers to reconstruct the received intensity image.

Figure 1F:
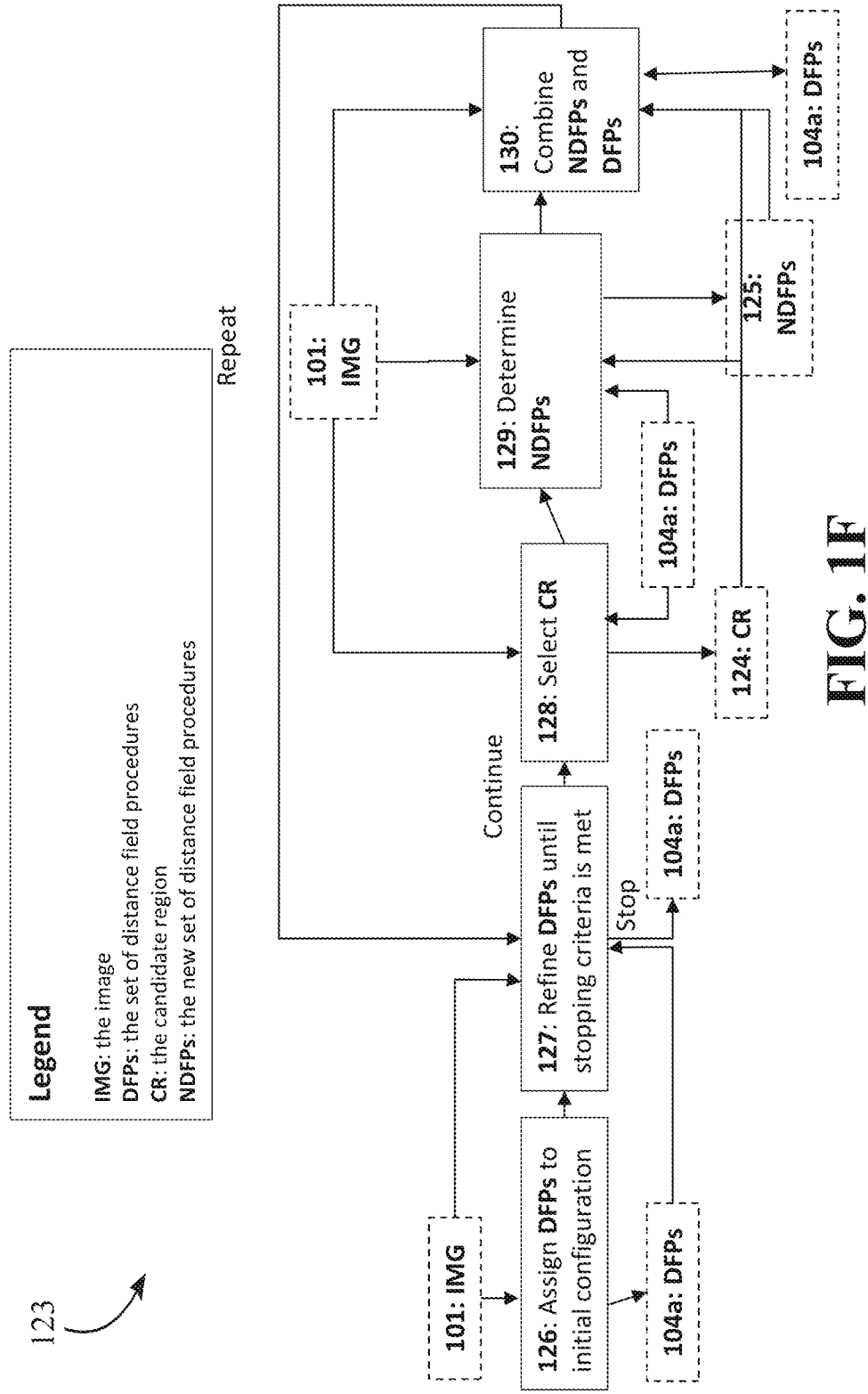
FIG. 1F illustrates another flow diagram of another method for image processing based on refinement in layered DF transformation of an intensity image, according to some embodiments of the present disclosure.

Another variation of the method 119 is illustrated in FIG. 1F.

FIG. 1F illustrates another flow diagram of a method 123 for image processing based on layered DF transformation of the intensity image 101, according to some embodiments of the present disclosure. Hereinafter, for the purposes of explanation in conjunction with some flow diagrams, the intensity image 101 may be represented as IMG 101 interchangeably.

The method 123 includes, at step 126, assigning a DFP 104a to an initial configuration of the IMG 101. The initial configuration may be an empty set, wherein the assigning uses the image, IMG 101, to determine the initial configuration of the set of DFPs 104a, wherein the initial configuration is a set of DFPs 104a determined by various means to establish a starting point for the refining, wherein the various means include interpolation, regression, optimization, human editing, an AI system, a search method (random search, grid search, cell search, divide-conquer-combine search, trial and error search, etc.), and combinations thereof. The starting point includes auxiliary data, wherein the auxiliary data is stored along with the set of DFPs 104a to enable the reconstruction of the image, IMG 101, wherein the auxiliary data is a compressed version of the image, a low-resolution version of the image, an approximation of the image, an interpolation of the image, and the like.

In some embodiments, the initial configuration may be determined by storing a small low-resolution version of the image IMG 101 along with the set of DFPs 104a such that the reconstruction of the image begins with rendering IMG 101 followed by the rendering of the set of DFPs 104a on top of IMG 101.

At the next step 127, the DFP determined at step 125 is refined until a stopping criteria is met. If the stopping criteria is met, then the method 123 stops and the DFP 104a available at step 127 is saved as the DFP 104a for a particular layer.

For refining the DFPs, the image is decomposed into tiles, wherein the tiles are processed sequentially, are processed in parallel. Further, the refining operates at increasing levels of detail (stepwise continuous, discrete stages such as low-medium-high) for efficient computation and for determining a progressive (coarse to fine) representation of images. To that end, the refining performs a one-time preprocessing of the image to produce preprocessed image data, wherein the preprocessed image data includes edge maps, gradient maps, Laplacian maps, zero crossing maps, filtered versions of the image, a frequency domain version of the image, a wavelet decomposition of the image, statistics, and the like. The edge, gradient, Laplacian, and zero crossing maps may be determined at a sub-pixel resolution.

Some embodiments provide performing a filtering operation to be applied once to the image prior to the refining, wherein the filtering operation performs a sharpening, a denoising, and the like (to compensate for or to compliment the) rendering characteristics of the set of DFPs. To that end, refining uses a smaller sub-sampled version of the image to improve performance of the refining, alternating between the image and the sub-sampled version of the image periodically during the refining. Refining is continued in the manner described above, till the stopping criteria is met.

The stopping criteria may include a plurality of factors, including, but not limited to: a time limit is exceeded, a maximum iteration count is exceeded, an error tolerance is met, a lack of convergence over a sequence of refining steps occurs, and the like. The stopping criteria may be image independent, image dependent, dynamically updated (changes during refining steps), static, controlled by visual inspection, by human guidance, by an AI, determined by a procedure, or even determined by a table.

If the stopping criteria not met, then the method 123 continues to step 128. At step 128, a candidate region (CR) 124 is selected from the IMG 101, or for a layered DF image, depending on whether it is the first iteration or a subsequent iteration of the method 123, respectively. The CR 124 is a region corresponding to a respective location in the IMG 101 or any layered DF image. To that end, each of the plurality of locations in the IMG 101 or any layered DF image correspond to a respective candidate region of a plurality of candidate regions in the received intensity image, IMG 101, or any layered DF image. To that end, at step 129, a new set of distance field procedures (NDFPs) 125 is identified. The NDFPs 125 are identified on the basis of the full set of DFPs 104a stored in the DF module 104. Finally, at step 130, the DFPs 104a and the NDFPs 125 are combined, and saved as the updated set of DFPs 104a, associated with corresponding candidate regions CR 124. Thereafter, this process of refinement of DFPs may be repeated, until the stopping condition or criteria is met. After refinements are complete, the final layered DF image is used to reconstruct the intensity image.

Some embodiments further provide determining an error value associated with a difference between intensities of the received intensity image IMG 101 and an intensity image reconstructed from the layered DF image. This error value is then compared with a threshold error value and the reconstructed image is updated update the reconstructed image based on the comparison. This will be explained further in conjunction with FIG. 2A and FIG. 2B.

Figure 2A:
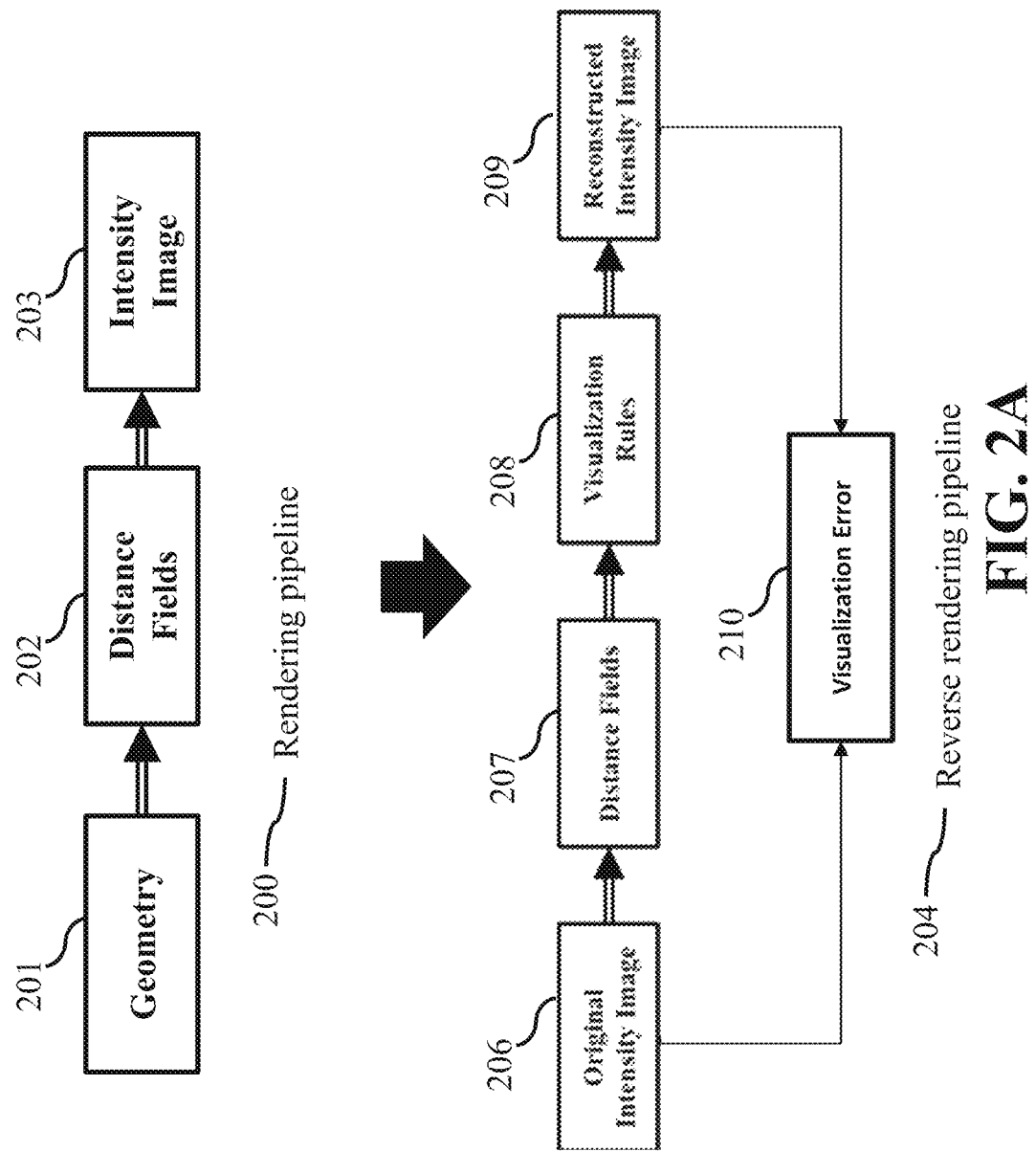
FIG. 2A and FIG. 2B illustrate block diagrams showing possible implementations of the layered DF transformation of an intensity image based on the concept of reversal of rendering pipeline, according to some known solutions.
Figure 2B:
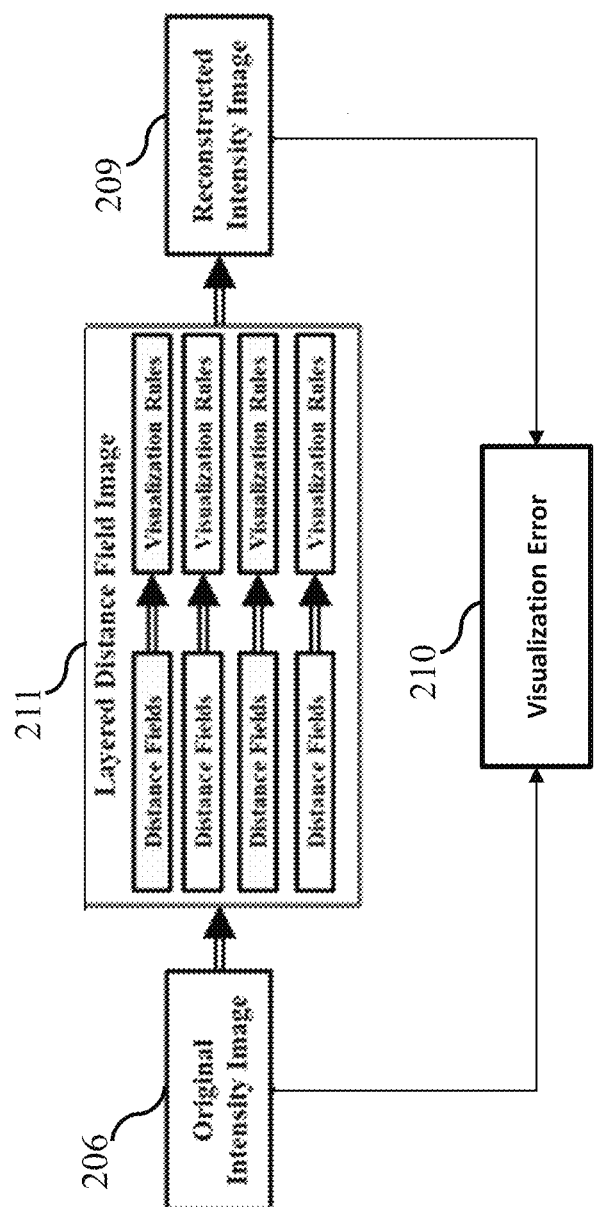

FIG. 2A and FIG. 2B illustrate block diagrams showing possible implementations of the layered DF transformation of an intensity image based on the concept of reversal of rendering pipeline, according to some known solutions.

FIG. 2A illustrates a rendering pipeline 200. The rendering pipeline 200 refers to the key components that are required for rendering of any intensity image, such as an intensity image 203. The rendering pipeline 200 may begin from a basic unit of viewing or rendering, such as a geometry 201 corresponding to any shape, object, portion, location, region or primitive in an overall image. Firstly, distance fields 202 corresponding to various points or locations in the geometry 201 are determined. Then the distance fields 202 are used for rendering the intensity image 203, using image reconstruction functions specifically targeting rendering an image from data about distance fields of various points of the intensity image 203. For example, in case of 2D geometries, it is already disclosed that the distance fields 202 comprise a set of signed minimum distances for various points in the space of the 2D geometries, from the boundary of the corresponding 2D geometry. The sign and magnitude of the distances are then suitably converted to intensity values for pixels. To that end, some geometries may be represented by their distance maps, which comprises a map of regularly sampled distance values for a geometry (such as geometry 201).

Another representation of distance fields may be derived using Adaptively Sampled Distance Fields (ADFs), which may use detail directed sampling of distance fields for the geometry 201. To that end, sampling at higher rates is done where there is significant variance in the distance field, therefore there is too much detail in the geometry 201. Similarly, sampling at lower rates is done, where the distance field varies slowly or where accuracy is not needed, such as in low detail portions of the geometry 201. The sampled distances obtained as a result of this detail directed sampling are then stored in a suitable data structure, such as using a hierarchical representation of data storage, or by using on demand sampling of distance fields. Thereafter, a reconstruction function for reconstructing the distance field from adaptively sampled points in the space of the geometry 201 may be used to reconstruct the intensity image 203.

This rendering pipeline requires computationally expensive analytic filters for computing sampled distances. Also, storage requirements for successively hierarchical data structures are large, making overall image processing based on rendering pipeline 200 computationally and storage expensive.

Some embodiments are based on the recognition that an alternate method, based on reversing of the rendering pipeline 200 may be computationally superior, in terms of storage and performance.

FIG. 2B illustrates a block diagram of such a method, based on a reverse rendering pipeline 204. The reverse rendering pipeline 204 begins with an original intensity image 206, from which distance field data 207 for each point or location in the original intensity image 206 is determined. Thereafter, this distance field data 207 is operated upon by a set of visualization rules 208 (and this operation may be done iteratively), to obtain a reconstructed intensity image 209. The operation of the visualization rules is conducted iteratively based a visualization error parameter 210, which determines a stopping condition to stop the operation of the visualization rules 208 and render the reconstructed intensity image 209.

Further, some embodiments are based on the recognition that the reverse rendering pipeline 204 may be computationally more efficient, if the processing tasks needed for intermediate steps of distance field data 207 computation and visualization rules 208, may be broken down into smaller chunks of processing tasks.

To that end, FIG. 2B illustrates and architecture of the reverse rendering pipeline 204 for more efficient operation, where the original intensity image 206 is converted to the reconstructed intensity image 209 by using a layered distance field image 211, comprising smaller chunks of processing tasks including layer-by-layer distance fields and visualization rules computations, governed by visualization error minimization for each layer of processing. Also, such layer-by-layer processing can operate directly on various color or intensity channels of the original intensity image 206, thereby not requiring large hierarchical data structures for storage. To that end, such layer-by-layer processing is implemented by the image processing system 102 shown in FIGS. 1A-1F discussed previously. The image processing system 102, is configured to execute the method 119 and the method 123 and transform an intensity image into a layered DF image comprising an ordered sequence of multiple layers, as is already discussed. For this, different layers are associated with a set of DF procedures, which are equivalent to the DFPs 104a shown in FIG. 1B, and a set of rules, such as rules 105 shown in FIG. 1B, which are equivalent to the visualization rules 208 shown in FIG. 2A. Such layered DF image transformation is further used to implement the reverse rendering pipeline 204 shown in FIG. 2A, governed by the visualization error 210 as a stopping condition, which is explained further by a method 212 illustrated in FIG. 2C.

Figure 2C:
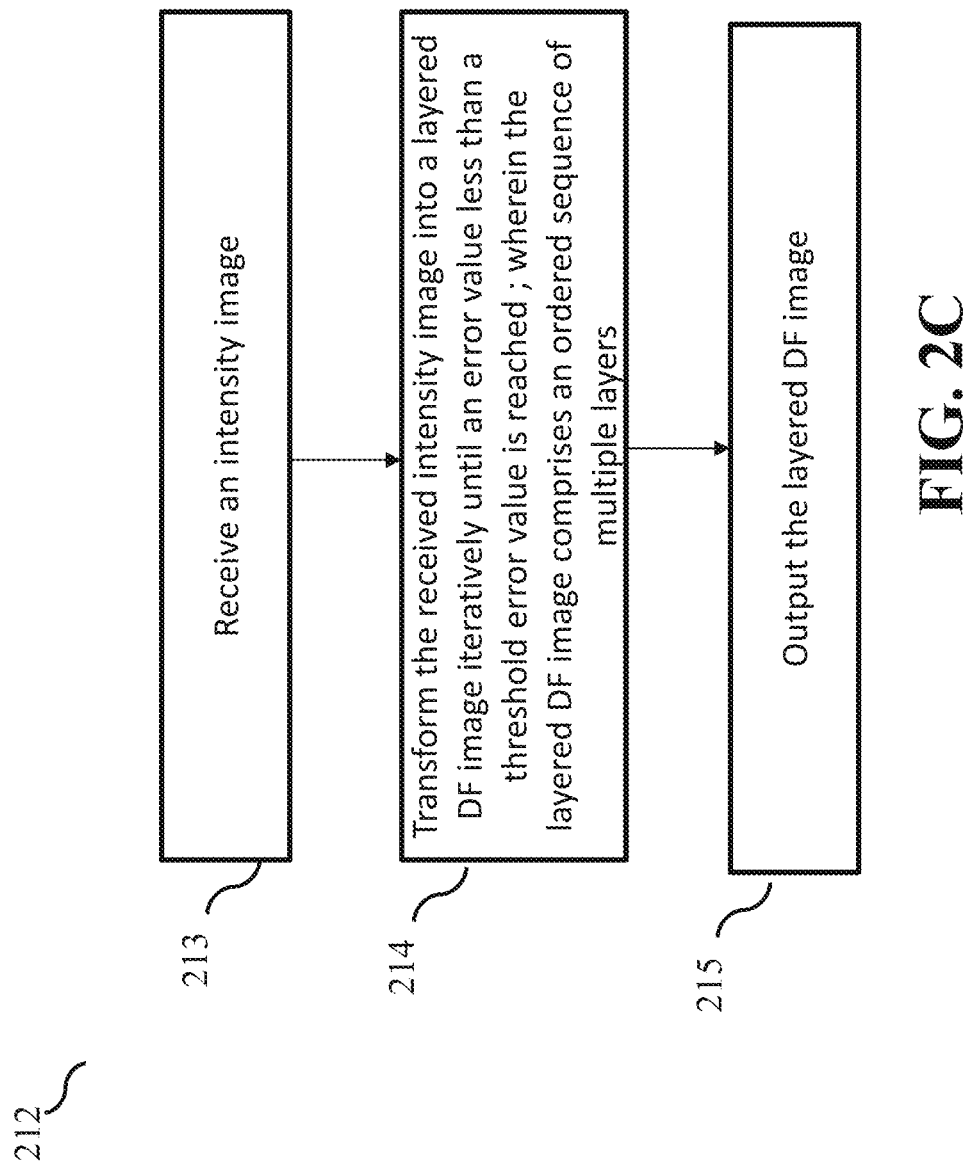
FIG. 2C illustrates a flow diagram of a method for image processing based on an iterative optimization on an error value, according to some embodiments of the present disclosure.

FIG. 2C illustrates the method 212 for transforming an intensity image to a layered DF image, according to an embodiment. The method 212 may be executed by the image processing system 102 shown in FIG. 1B.

The method 212 comprises, at step 213, receiving the intensity image. As previously stated, the image processing system comprises the input interface 107 that is configured to receive the intensity image 101.

The method 212, further comprises, at step 214, transforming the received intensity image into a layered DF image. To that end, the received intensity image 101 is then passed to at least one processor, such as processor 109 shown in FIG. 1B. The processor 109 is configured to execute computer-executable instructions that may be stored in a memory or in a computer-readable storage medium. The computer-executable instructions to may in turn be configured to execute various operations for transformation of the received intensity image 101 into a layered distance field (DF) image including an ordered sequence of multiple layers. Each layer in the ordered sequence including a DF procedure, such as one of the DFPs 104a shown in FIG. 1B, defining DF values at all locations of the received intensity image 101 and rules, such as the visualization rules 208 shown in FIG. 2A, for mapping these DF values into intensity values of the layer. To that end, the processor is configured to transform the intensity image 101 iteratively to the layered DF image 106 until an error value is less than a threshold error value or the error value reaches a value lesser than the threshold error value. The error value is a measure, for each layer, of an error or difference between the intensity image 101 and an intensity image reconstructed from the layered DF image 106 by combining the intensities values of each level in their corresponding order. When such an error value condition is reached at a layer of transformation, the error value minimization is achieved. The intensity values at that layer of transformation, are then used, at step 215, to output the layered DF image for rendering.

The layered DF image may be rendered by the output interface 108 as already stated in conjunction with FIG. 1B.

To that end, the error value may be considered as the reconstruction error or the visualization error 210 and reaching the visualization error lesser than the threshold error value is the stopping condition for stopping the iterative transformation of the intensity image 101 to the layered DF image 106. To that end, the visualization error 210 value may be computed by computing a sum of distances between intensities of pairs of corresponding pixels at corresponding locations in the received intensity image 101 and the reconstructed intensity image for that particular layer. The intensity image is reconstructed from the layered DF image 106 for that layer, using an image reconstruction function discussed previously. To that end, from the computed sum of distances for an iteration, the biggest distance among the pairs of corresponding pixels in the received intensity image and the reconstructed intensity image is identified. Then, a current DFP for a current layer of that iteration that reduces the biggest distance among the pairs of corresponding pixels in the received intensity image and the reconstructed intensity image, to minimize the visualization error 210 to a value below the threshold error value, is selected. This is referred to as a greedy optimization method for searching for a DFP for a current layer in a current iteration of the method 212. Such greedy optimization is done to select the current DFP reduce the biggest distance among the pairs of corresponding pixels and to reduce the visualization error 210 for the entire reconstructed image to the minimum possible value, defined by the threshold error value.

Some embodiments are based on the recognition that the received intensity image 101 may be partitioned into a set of candidate regions. The candidate regions correspond to the various locations on the intensity image 101. For example, the candidate regions may be identified as curves, tiles, or grids, with each of the curve, tile or grid centered around the corresponding location in the intensity image 101. Then, for each candidate region, a local current DFP that reduces the biggest distance among the pairs of corresponding pixels of the candidate region in the received intensity image and the reconstructed intensity image to produce a set of local current DFPs is identified. This local current DFP is then combined with the set of local current DFPs to produce the current DF procedure.

To that end, the set of candidate regions may be a union of nonoverlapping tiles covering the received intensity image 101 in its entirety. Further the current DFPs include a Boolean combination of the set of local current DFPs. In some embodiments, the partitioning the intensity image 101 into the set of candidate regions is done based on greedy optimization methodology. The greedy optimization methodology includes setting dimensions of the candidate regions partitioned for the current iteration to be greater than dimensions of the candidate regions partitioned for a previous iteration of the greedy optimization.

Some embodiments are based on the recognition that the partitioning of the intensity image 101 into candidate regions, and the minimization of the visualization error value 210 are done using greedy optimization to achieve iterative optimization at each layer level, for the transformation of the intensity image 101 to the layered DF image 106 at each level. To that end, this layer-by-layer iterative optimization is done for achieving successive refinement of an image over different layers. The successive refinement may be done based on a level of detail (LOD) associated with the visualization error value 210. At each layer, an image obtained by rendering the current set of DFPs for that layer may be referred to hereinafter as a working canvas WC.

In some embodiments, the LOD comprises a current resolution of the layered DF image (such as layered DF image 106 or layered DF image 211). Thus, the method 212 comprises transforming the intensity image (such as intensity image 101 or intensity image 206) into the layered DF image using an iterative optimization, wherein the iterative optimization comprises producing a current DF procedure of a current layer that reduces the error between the current resolution of the received intensity image and a current intensity image reconstructed from a current sequence of multiple layers including the current layer and previous layers (such as the reconstructed intensity image 209) determined by previous iterations of the iterative optimization. To that end, the different iterations of the iterative optimization use different resolutions of the received intensity image varying from a lower to a higher resolution in a proportion to an index of the iterations. For example, layer 1 may have a resolution R1, layer 2 may have a resolution R2, so on and so forth.

To that end, in some embodiments, the method 212 may be executed iteratively to determine a sequence of DFPs defining the sequence of multiple layers of the layered DF image 211 and to initialize and iteratively update the sequence of DFPs based on a LOD, until a termination condition (equivalent to the stopping condition disclosed earlier) is met. Each iteration may in turn include selecting a candidate region of the received intensity image, determining a new DFP for the selected candidate region, and combining the new DFP with the sequence of DFPs identified in a previous iteration. This may be further illustrated by the flow diagram shown in FIG. 2D.

Figure 2D:
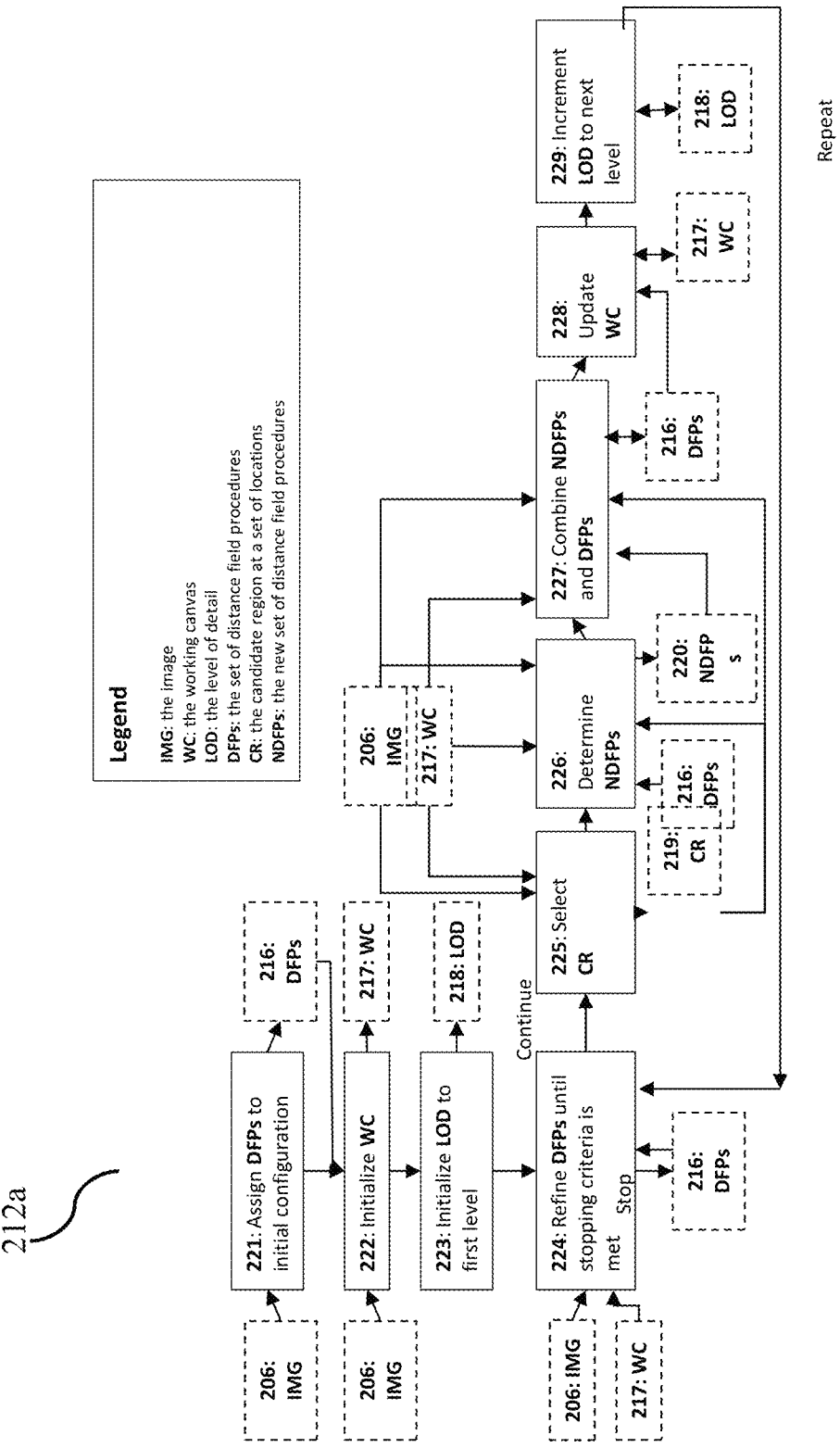
FIG. 2D illustrates another flow diagram of a method for image processing based on a level of detail, according to some embodiments of the present disclosure.

FIG. 2D illustrates a flow diagram of a method 212a for transforming the intensity image to the layered DF image based on the LOD for searching the set of DFPs until the termination condition is met. For the purposes of consideration in the method 212a, the intensity image is represented as IMG 206, a current set of DFPs is DFPs 216, a rendered image for each layer is the working canvas WC 217, a level of detail value is LOD 218, a candidate region at one or more locations is CR 219, and a new set of DFPs obtained by updating the current set is NDFPs 220.

The method 212a comprises, at step 221, assigning DFPs to an initial configuration for the IMG 206. The initial configuration may be an empty set of DFPs. Alternately, the initial configuration may be a set of DFPs determined by various means to establish a starting point for the refining of the IMG 206. The various means include interpolation, regression, optimization, human editing, an AI system, a search method (random search, grid search, cell search, divide-conquer-combine search, trial, and error search, etc.), and combinations thereof. After assigning the DFPs to the initial configuration, the method 212a includes, at step 222, initializing a WC. The WC may also be initialized by a rendering of the initial configuration of the set of DFPs. Consequently, the rendering may include rendering a blank image, an empty image, a constant color image (e.g., equal to the average color of the image, a common color of the image).

The starting point for initializing the WC may be defined by one or more of interpolation, regression, optimization, search, filtering, and the like, wherein the starting point includes auxiliary data, wherein the auxiliary data is stored along with the set of DFPs to enable the reconstruction of the image. The auxiliary data may be a compressed version of the image, a low-resolution version of the image, an approximation of the image, an interpolation of the image, and the like. To that end, assigning of the set of DFPs 216 to the initial configuration and the initializing of the WC 217 are often coordinated (i.e., designed in unison) to determine a good starting point for the refining steps. For example, one particularly effective coordinated design is to assign the initial configuration to the empty set and to initialize the WC to a small low-resolution version of the image S which is stored along with the set of DFPs 216 such that the reconstruction of the image begins with rendering S followed by the rendering of the set of DFPs 216 on top of S.

Further, at step 223, the LOD 218 is also initialized to a first level. Thereafter, at step 224, the set of DFPs 216 is refined iteratively until the stopping condition is met. As discussed earlier, the stopping condition comprises determining the error value between the current layered DF image and the original intensity image and checking if this error value has become lesser than the threshold error value. This is explained further in conjunction with steps 225-229 which define the operations performed in each iteration for refinement of the DFPs.

At step 225, a candidate region is selected. Selecting of the candidate region is guided by an error metric determined by such as by using a greedy method, an optimization method, a trial-and-error method, a grid search method to ensure coverage, a cell search method to ensure coverage, a random search method, a divide-conquer-combine search method, and the like. To that end the candidate region is determined by a maximum error, by locations of substantial difference, at a set of locations, using any of a local error metric or a global error metric. The global error metric is increased by allowing divergent steps or by other means including trial and error, grid search, cell search, random search, divide-conquer-combine search, or a combination thereof.

The error metric or the error value may correspond to a measure of closeness between a rendering of the set of distance field procedures (that is the WC 217) and the image (that is IMG 206) using various norms including L1, L2, perceptual, AI based, and the like. In some embodiments, each norm may additionally include a penalty term to encourage a simpler and smaller representation (e.g., fewer distance field procedures) to emerge as the optimized option or norm. After the selection of the candidate region in this manner, at step 226, a new set of DFPs for the candidate region is determined using the set of previously stored DFPs 216, the WC 217 and the original image IMG 206. Thereafter, at step 227, the new DFPs NDFPs 220 are combined with the previous DFPs 216 and an updated set of DFPs 216 is formed. Then, at step 228 the WC 217 is updated based on the updated DFPs and at step 229, the LOD 218 is incremented to next level. These steps are then repeated by checking for stopping condition at step 224. If the stopping condition is met, then the method 212a is halted, and the WC 217 of the last stage is rendered to give the output image.

To that end, the LOD 218 is incremented at each level in a course to fine manner for each level to produce different degrees of a coarse to fine (or fine to coarse) progression between successive refinement layers in the transformation methods 212 and 212a. In some embodiments, the increments in the LOD 218 may be governed by one or more processes, including but not limited to: a constant for the first level and the next level (i.e., a zero increment), by permitting a single level of detail (flat progression, zero progression, and the like), determined by a procedure, determined by a table, controlled by visual inspection, by human guidance, by an AI module, being image independent, being image dependent, set manually and/or procedurally to control and/or achieve specific criteria for the nature of the progression (e.g., smoothness) and the size and quality of the representation of the image, dynamically updated, statically updated, and the like.

In some embodiments, the initial configuration determined at step 221 may be an empty set and the WC 217 may be initialized by rendering the initial configuration of the set of DFPs 216 into the working canvas. Then, the LOD 218 may be initialized to a coarse level. Further, the stopping criteria may be specified as refining halts when a difference between the image and the working canvas is less than a threshold error value. For refining, a one-time preprocessing of the image IMG 206 is performed to produce preprocessed image data which includes edge maps determined at a sub-pixel resolution. The error value for defining the stopping condition may be chosen as L2 error metric for measuring the difference between the image IMG 206 and the working canvas WC 217.

Further, the candidate region is selected by finding a small set L of locations in the image with the biggest L2 errors (i.e., by using the greedy method which chooses locations where the match between the image and the working canvas is worst). Then, a union of a new set S of DFPs, that is the NDFPs 220, located near each location P in L that improves a local L2 error metric in a region surrounding P when S is arithmetically combined with the set of DFPs. Each distance field procedure in S is derived from strokes that follow edges determined in the preprocessed image data and which reduce the difference between the working canvas and the image in the region surrounding P. The strokes are determined by curve fitting locations and color attributes. The fineness of the strokes is dictated by the level of detail: a coarse level of detail uses a big soft brush while finer levels of detail use smaller (i.e., finer), harder, and more intricate brushes; this leads to a progressive reconstruction of the image. The distance field procedures in S use detail directed resolution independent distance fields to represent the strokes at the appropriate level of detail.

Further, the working canvas is updated from the set of distance field procedures DFPs 216, the working canvas is updated by rendering the set of distance field procedures into the working canvas. Further, the LOD 218 is incremented to a next level, which may be a finer level.

This way, the method 212a may be implemented in a working example. To that end, in some embodiments, the NDFPs 220 are combined with the DFPs 216 using an arithmetic procedure. Also, as discussed in the working example above, the candidate region is selected based on the error between intensities in the selected candidate region of the received intensity image and a corresponding region of the reconstructed intensity image, such as from the WC 217.

In some embodiments, the partitioning of the received intensity image into the candidate regions includes partitioning into a grid of rectangular regions. For example, using a grid search method, the received intensity image may be partitioned into 16×16 grid of squares. Thereafter, as discussed in the method 212a and the working example, points within each region in the grid having a reconstruction error greater than a threshold error value are selected. For example, a random point P in each square where the L2 error is greater than a specified threshold is identified. The neighborhoods around each P constitute the collective candidate region. These selected points are then used to solve an optimization problem for each selected point with a region that produces a DF procedure for each selected point, such that an algebraic combination of the DF procedures of the selected points reduces the reconstruction error within the region. To that end, in different iterations of the iterative optimization, a grid size for each subsequent iteration may be increased. Like the grid size may be increased on each refining step (e.g., 32×32, 64×64, 128×128, etc.) to ensure convergence to a solution. To that end, for the combining step 227, the optimization problem for each square is solved and corresponding point P in the grid which determines a union of a new set S (NDFPs 220) of detail directed resolution independent distance field procedures located near P that minimizes a local L2 error metric in a region surrounding P when S is arithmetically combined with the set of distance field procedures (DFPs 216). If the underlying distance fields of S capture the detail commensurate with the size of the squares to which they belong, where bigger squares capture broader lower frequency components of the image while smaller squares capture finer higher frequency components of the image, a smooth visually appealing progressive reconstruction of the image that proceeds from high level structure to fine intricate detail is obtained.

In some embodiments, the received intensity image may be pre-processed to extract pre-processed image data at a sub-pixel resolution and use the pre-processed image data to convert the received intensity image into the layered DF image. To that end, the pre-processed image data include one or combination of edge maps, gradient maps, Laplacian maps, zero-crossing maps, filtered versions of the received intensity image, a frequency domain version of the received intensity image, wavelet decomposition of the received intensity image, and intensity statistics of the received intensity image.

In some embodiments, after the stopping condition is met, intensity operations on the intensity image reconstructed from the layered DF image are estimated and stored to further reduce the error with the received intensity image.

To this end, the methods 212 and 212*a* are configured to achieve the objective of successive refinement of an image using layer-by-layer transformations, governed by convergent solution to an optimization problem of optimizing computations, complexity, size, quality, and storage in image transformation process. The convergent solutions is possible by using a greedy optimization method for minimizing error values and for selecting candidate regions, while reduced computational complexity is achieved by selecting appropriate size of candidate regions and breaking down overall computations into chunks of processing for each layer to achieve successive refinement. Such successive refinement is illustrated by a working example shown in FIG. 2E.

Figure 2E:
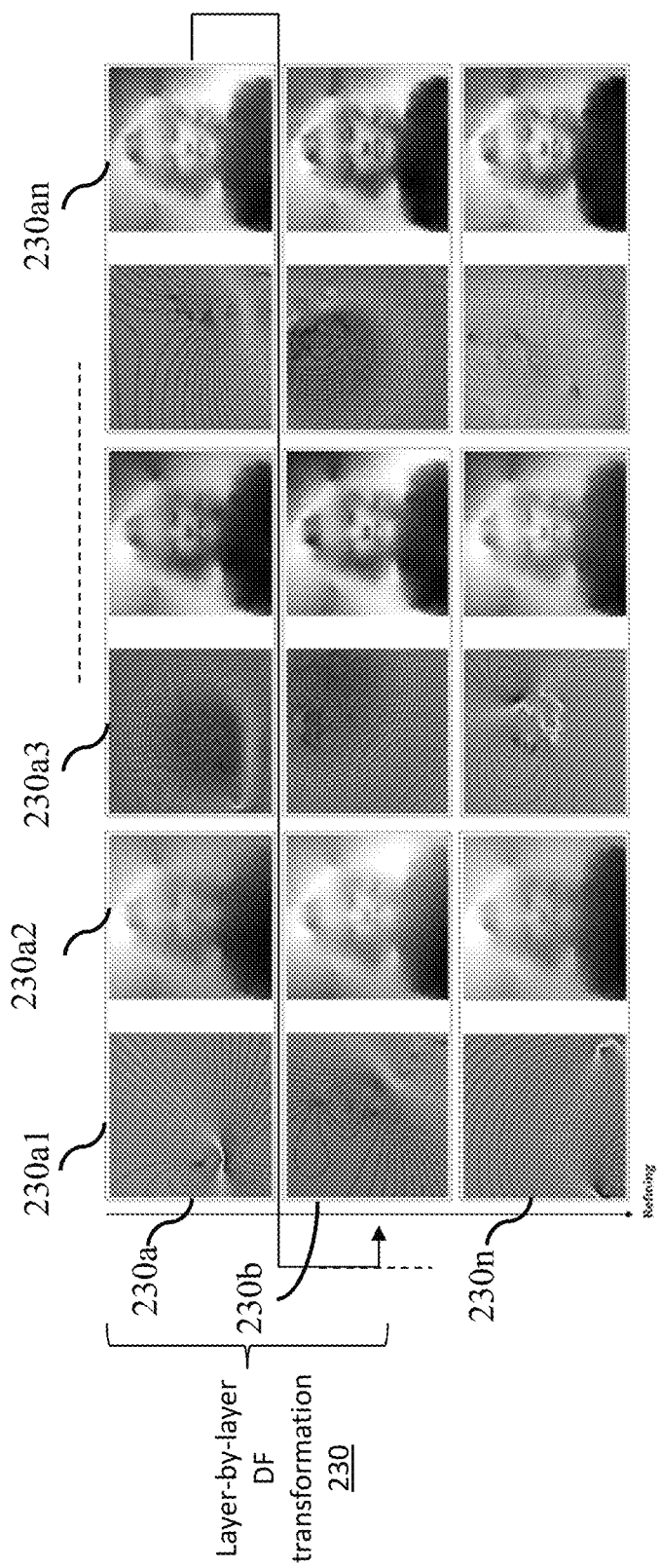
FIG. 2E illustrates a schematic diagram of a layer-by-layer refinement achieved by the methods illustrated in FIG. 2C and FIG. 2D, according to some embodiments of the present disclosure.

FIG. 2E illustrates a schematic diagram of a layer-by-layer DF transformation 230 achieved by the methods illustrated in FIG. 2C and FIG. 2D, using a working example. The layer-by-layer transformation operates successively on layers 230*a*, 230*b*, . . . , 230*n*. The output of each layer is used an input for refinement for the successive layer, and this successive refinement is continued till the stopping condition is met. For example, the output image rendered at layer 230*a* is used an input image to the layer 230*b*, and so on.

At each layer, the transformation takes place according to methods 119 and 123 illustrated in FIGS. 1E and 1F respectively, and methods 212 and 212*a* illustrated in FIGS. 2C and 2D, respectively. The processing for each layer begins for a series of refinements proceeding from top to bottom, that is from layer 230*a* to layer 230*n*, and from left to right, that is from stage or frame 230*a*1 to 230*an*. Each frame contains the new set of distance field procedures NDFPs 220 for the refinement step and the working canvas WC 217 after the refinement step showing the effect of the determined NDFPs. At each step, the speed of convergence and the smooth progressive detail directed multi-resolution nature of the refinement increases gradually.

Thus, successive refinements may be configured to select a set of operations (e.g., Boolean, blending, arithmetic, etc.) to act on a set of distance fields which are positioned at a set of locations determined from the candidate regions. The set of locations may be associated with the candidate regions by being any of near or centered around the candidate region. The distance fields may in turn take on various forms including strokes, filled regions, textured regions, gradients, edges, parameterized templates (of all kinds for matching regions of the image including noise (at different amplitudes, orientations, and frequencies), textures, and the like), detail directed distance fields, regularly sampled distance fields, procedural distance fields, analytic distance fields, distances stored in a memory, and the like.

In some embodiments, the determination of various operations on the distance fields may be guided by the error metric by any of a greedy method, using an optimization method, using a greedy stepwise optimization method to avoid solving a high dimensional problem and instead by solving one dimension at a time (each step at each layer) and combining the steps. Further, the successive refinement proceeds by using any of a curve fitting method, using locations of maximum error, and using locations of substantial difference to locate the distance fields at a set of locations, using a local error metric, using a global error metric, allowing divergent steps and the like.

In some embodiments, the curve fitting may be done to resemble intuitive brush strokes of a painting process. The brush strokes may be any of fixed width, variable width, fixed density, variable density, solid, textured, procedural, static, dynamic, produce positive and negative values to enable modeling both drawing and erasing on a surface, wherein a stroke includes a sequence of splines, polynomials, procedures, functions, points, curves, and the like with related attributes (such as location, pressure, width, color, luminance value, chrominance value, opacity, profile, texture data, time data, etc.).

The successive refinement of images in the manner described in all the previous embodiments provides for a smooth and natural progressive viewing of the reconstructed image, without unexpected jumps and visual artifacts. This is achieved by allowing the expressive power of the new set of DFPs to grow with each refining step. Expressive power is dictated by the number of operations, the number of distance fields, the number of locations, the complexity of the operations, and the like. In essence, this is done to emulate the actions used by artists who often begin a painting as a rough sketch with a large soft brush and then proceed to add detail by painting with a sequence of smaller and smaller (i.e., finer) harder brushes. Consequently, fine brush strokes are used only where necessary to refine the painting while the rest remains coarse. At the same time, progressive refinement, and search for NDFPs provides graceful (i.e., smooth, expected, predictable) progressive visual refinement of the image with no visual artifacts and unexpected changes as the progression unfolds, can guarantee that a specified error tolerance is gracefully met when critical (e.g., medical applications). Therefore, using the methods described above, very high-quality images may be obtained.

Some embodiments are based on the recognition that transformation of the intensity image to the layered DF image also provides flexibility to transform the image to achieve desired levels performance and optimization characteristics, including, but not limited to: compression, texture, resolution, and detail. To that end, the image processing system 102 may be configured provide capability to specify the desired level of performance characteristic.

Figure 3A:
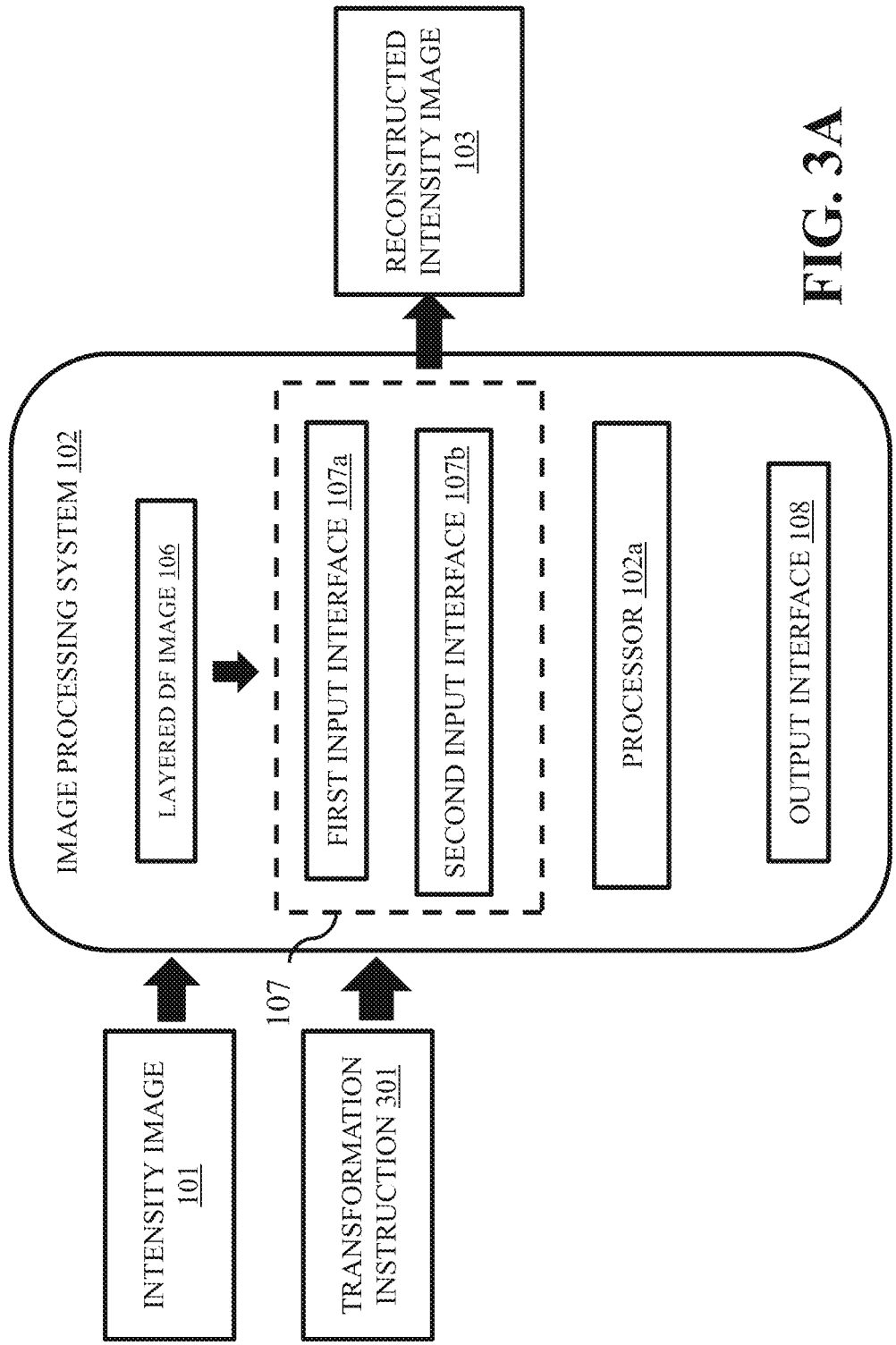
FIG. 3A illustrates a high-level block diagram and example images showing transformation of an intensity image into a distance fields-based image, according to some embodiments of the present disclosure.

FIG. 3A illustrates the image processing system 102 configured for receiving a transformation instruction 301, for transforming an input image to a desired level of performance and optimization characteristic. The image processing system 102 is already explained in previous embodiments.

As illustrated in FIG. 3A, the image processing system 102 comprises the input interface 107, which may further have a first input interface 107a and a second input interface 107b. The first input interface 107a is configured to receive an input image, which may be the layered DF image 106. The first input interface 107a may comprise an interface configured for receiving an external input, such as from a user, from an external source, from a remote server, from a database and the like. However, the first input interface 107a may be an internal interface, such as a system bus, which transfers inputs within the image processing system 102. The layered DF image 106 is received via any of the internal or external sources. The layered DF image 106 includes an ordered sequence of multiple layers, such as those illustrated in FIG. 2E, where each layer of the layered DF image 106 includes a DF procedure defining DF values at all locations of the received intensity image and rules for mapping these DF values into intensity values of that layer.

The input interface 107 also comprises the second input interface 107b, which is configured to receive the transformation instruction 301. The transformation instruction 301 may be received by a user, from an external source, from an internal source, and the like. To that end, the second input interface 107b may also be an internal input interface or an external input interface. The second input interface 107b may receive the transformation instruction 301 to transform the layered DF image 106 based on the transformation instruction and output the reconstructed intensity image 103 obtained from the transformed layered DF image through the output interface 108.

To that end, the transformation instruction 301 may specify one or a combination of (1) a compression parameter, such that the transformed layered DF image includes a compression of the layered DF image, (2) a texture mapping parameter, such that the transformed layered DF image includes the layered DF image with modified texture, (3) a zooming instruction, such that the transformed layered DF image includes a zoomed version of the layered DF image, and (4) an algebraic instruction, such that the transformed layered DF image includes a result of algebraic manipulation on the layered DF image.

The compression parameter may define a level of compression for the layered DF image 106. The layered DF image may be iteratively transformed to perform compression of the layered DF image to upper levels until the level of compression specified in the transformation instruction is met to produce the transformed layered DF image. Meeting of the desired level of compression occurs when the level of compression of the transformed layered DF image is equal to or less than the desired level of compression. To that end, to achieve the desired level of compression, the set of DFPs for the layered DF image at a layer may define parameters for lossless compression to produce a compressed layered DF image. Further, in situations where level of compression is not met, upper levels of the compressed layered DF image are removed from the successive layers until the level of compression is met to produce the transformed layered DF image.

In alternate embodiments, to achieve the desired level of compression, the set of DFPs for the layered DF image at a layer may define parameters for lossy compression to produce a compressed layered DF image. And in these situations also, if the level of compression is not met, upper levels of the compressed layered DF images are removed until the level of compression is met to produce the transformed layered DF image. To that end, the compression of the DF procedures may be set to be resolution independent. The resolution-independent DF procedures are appended to the top or final layer of the layered DF image 106 to produce the transformed layered DF image.

The compression of the layered DF image 106 in this manner is critical in many applications, such as in electronic devices like modern microscopes which create a data deluge with gigabytes of data generated each second, and terabytes per day, all in the form of images. Storing and processing this data is a severe bottleneck. In these applications, the compression representation described in preceding paragraphs is advantageous as it not only compresses the data but satisfies two other goals: 1) the representation can be operated on directly (e.g., rendered directly, queried directly) without performing a decompression step, and 2) the representation is adaptive to the content complexity of the data. Such an adaptive representation is also detail directed, focusing more representation power on the high frequency regions of the data and less representation power on the low frequency regions of the data, thereby overcoming memory and processing bottlenecks inherent in previously known solutions.

Figure 3B:
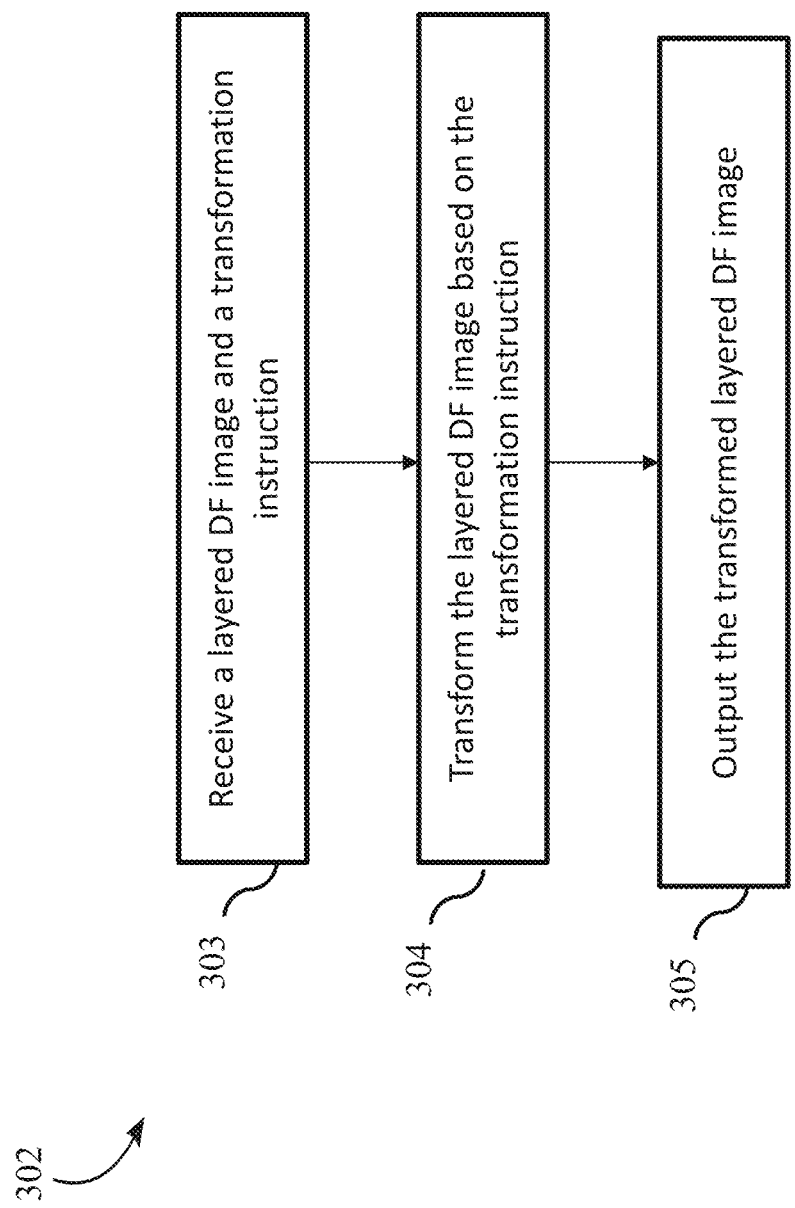
FIG. 3B illustrates a high-level flow diagram of method for transformation of a layered distance fields-based image based on a transformation instruction, according to some embodiments of the present disclosure.

The transformation instruction 301 may also specify a texture mapping parameter. Correspondingly, the texture mapping parameters are stored in a memory of the image processing system 102 in the form of a set of texture DF procedures defining different textures for at least a portion of the layered DF image. Further, the transformation instruction 301 indicates a desired texture which is used to select a texture DF procedure indicated by the desired texture from the set of texture DF procedures and append the selected texture DF procedure to a DF procedure of the top layer of the layered DF image. Alternately, the DF procedure of the top layer of the layered DF image 106 may be replaced with the selected DF procedure. To that end, the image processing system 102 may execute a method 302 illustrated in FIG. 3B, for transforming the layered DF image 106 according to a desired transformation characteristic specified in the transformation instruction 301.

The method 302 comprises, at step 303, a layered distance field (DF) image including an ordered sequence of multiple layers. The layered DF image may be received at the first input interface 107a. Also, as already discussed, each layer of the layered DF image includes a DF procedure defining DF values at all locations of the received intensity image and rules for mapping these DF values into intensity values of the layer. Additionally the transformation instruction 301 is also received at the second input interface 107b. The transformation instruction 301 specifies at least one of a compression parameter, a texture mapping parameter, a zooming instruction, an algebraic instruction, or a combination thereof.

Further, at step 304, the layered DF image is transformed based on the transformation instruction 301. The transformation occurs by selecting the set of DFPs with transformation parameter and appending or replacing the DFP of the top layer of the layered DF image with the transformed DFP. Based on the transformation, at step 305, the transformed layered DF image may be output at the output interface 108.

Figure 3C:
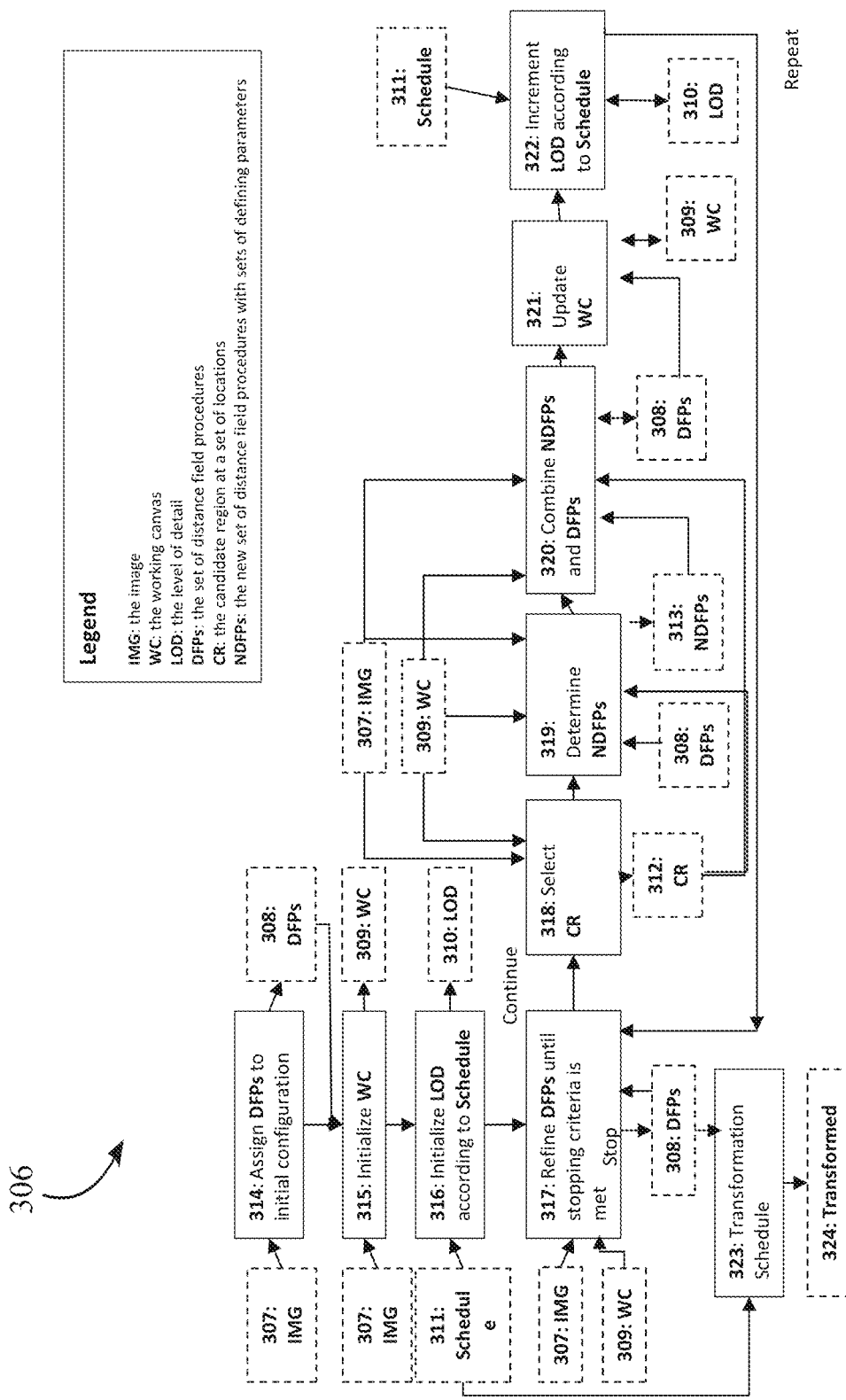
FIG. 3C illustrates a flow diagram of a detailed method for transformation of a layered distance fields-based image based on a transformation instruction, according to some embodiments of the present disclosure.

To that end, FIG. 3C illustrates another flow diagram of a method 306 for transforming a layered DF image to a transformed image, based on a transformation instruction. For the purposes of consideration in the method 306, the intensity image is represented as IMG 307, a current set of DFPs is DFPs 308, a rendered image for each layer is the working canvas WC 309, a level of detail value is LOD 310, a candidate region at one or more locations is CR 312, and a new set of DFPs obtained by updating the current set is NDFPs 313. These have already been discussed in the method 212a. However, the method 306 also includes data related to a schedule 311, which specifies a transformation instruction for selecting a transformation schedule 323 for transforming the set of DFPs, based on the transformation instruction. The resultant image is known as a transformed IMG 324.

The method 306 begins at step 314 by assigning DFPs to an initial configuration. The setting of the initial configuration is already explained in conjunction with FIG. 2D. Then, at step 315, the WC 309 is initialized. For example, when initial configuration is an empty set, the WC 309 may also be a blank or black image. Subsequently, the LOD 310 and the schedule 311 are also set to initial values. The LOD 310 may be varied from coarse to fine in some examples. The LOD 310 may also be initialized according to the schedule 311.

The schedule 311 may be configured to controls how the set of DFPs 308 are refined per step in a data efficient and distance field procedure independent manner thus avoiding additional data storage per step and/or per DFP. Thus, the schedule 311 permits step specific data and DFP specific data processing. Further, the schedule 311 specifies instructions for processing of the layered DF image at each layer to proceed in a coarse to fine (or fine to coarse) manner at various increments to produce different degrees of a coarse to fine (or fine to coarse) progressive compression in the image. To that end, in some embodiments, the processing of the layered DF image proceeds at a constant level of detail producing a single LOD 310 and a non-progressive (flat progressive, zero progressive) compression. The LOD 310 may be determined by any of a procedure, determined by a table, controlled by visual inspection, by human guidance, by an AI component, may be image independent or image dependent, may be dynamically updated or statically updated and the like. Once the initializations of the DFPs 308, the WC 309, the LOD 310 and the schedule 311 are done in this manner, at step 317, the refinement process of DFPs begins and the refinement is done progressively until a stopping criteria is met. The stopping criteria may determine the size and the quality level of the compressed image in an example. The stopping criteria is determined based a tradeoff between the size and the quality level of compressed image. In some embodiments the stopping criteria is set manually and/or procedurally to control and/or achieve specific criteria for the size and the quality level of the compressed image.

The refinement of the IMG 307 and the DFPs 308 continues from steps 318 to 322 until the stopping criteria is met. At each refinement, the DFPs 308 are updated as per the transformation schedule 323 and the transformed IMG 324, which are used to identify the quality (or size or similar constraint) of the transformed IMG 324. This quality is then compared with quality (or size or similar constraint) defined by stopping criteria. If the desired quality set by stopping criteria is reached, the refinement of DFPs is stopped, else steps 318-322 are continued.

At step 318, a CR 312 is selected from the WC 309 and a set of NDFPs 313 are selected for the WC 309, from the set of DFPs 308. Then at 320, the DFPs 308 and NDFPs 313 are combined (such as by replacement or appending), and based on this updated, at step 321, the WC 309 is updated. Further, at step 322, the LOD 310 is incremented according to the transformation schedule 311 and the LOD 310. For example if the transformation schedule specifies a transformation instruction specifying a compression parameter, then the LOD 310 for next layer may be set to next level of compression. Then, the steps 310-322 are repeated until the stopping criteria defining the desired level of compression is reached. The compression could be any of lossy, lossless, and the like.

To that end, image transformations based on set of updated DFPs are more accurate and provide more inherent redundancy, which is helpful in self-complementing any missing data in image compression. This is because in the DFPs, missing distance value for a locations surrounding distance values or surrounding locations.

Similarly, when the transformation instruction specifies a texture mapping parameter, the stopping criteria may determine the desired level of texture of the final output image. For any image, the detail supported by an image is determined by its resolution. This detail provides information about texture of the image. Obtaining enough detail everywhere can require extremely large images which compete for space, especially in limited GPU memory. Some known image representation techniques, such as Structured Vector Graphics (SVG) provide edge detail at any magnification but are simplistic, lack rich detail, are less general, and more complex to encode, evaluate, and filter.

However, using the schedule 311 defining the texture mapping information for the set of DFPs for each layer of the image provides resolution independent distance field procedures that significantly improving the quality, memory utilization, and performance characteristics for image synthesis. Moreover, because of the Single Instruction Multiple Data (SIMD) nature of the determined resolution independent distance field procedures, the method 306 provides for efficient rendering onto a display device and for various processing tasks imposed on texture maps.

In some embodiments, the transformation instruction specifies zooming instruction for generating the layered DF image based on a zoomed version of the layered DF image associate with a zooming level. The zooming level comprises an infinite upper bound.

In some embodiments, the transformations may be applied to any type of image, such as a font image, an image associated with a map of a geographical region and the like.

Thus, using the methods 302 and 306, any desired level of transformation to meet any desired output characteristic, like compression or texture, can be obtained of an image, with efficient processing and less storage requirements. To that end, the image processing system 102 may be implemented as a remote computing module, which can be accessed from any client device, which can be a lightweight client, to access the features of the image processing 102, without being too processing heavy.

Figure 4:
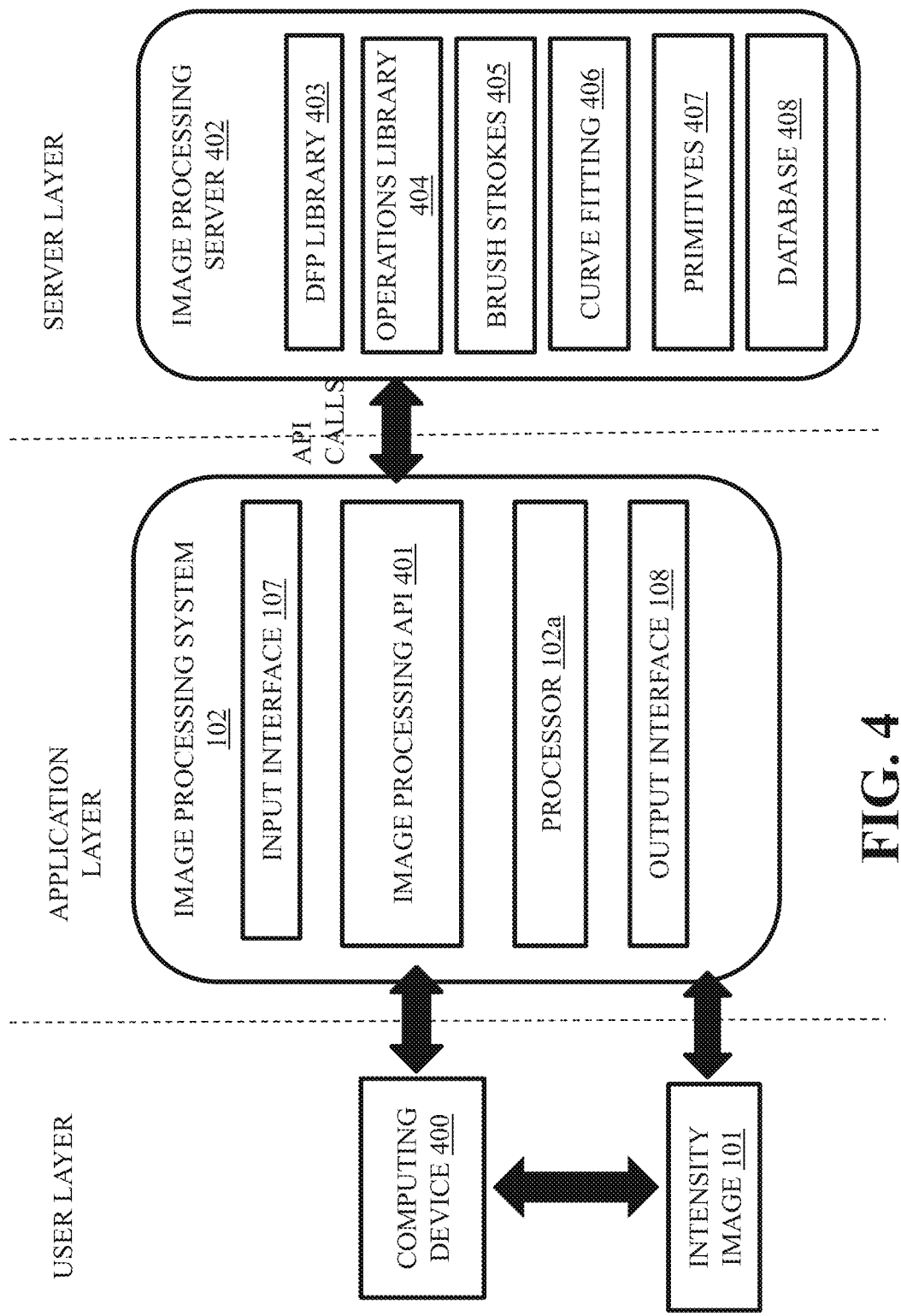
FIG. 4 shows a block diagram of an architecture of a computing system for image processing, according to some embodiments of the present disclosure.

FIG. 4 illustrates such an architecture for the image processing system 102. The image processing system 102 is configured to perform all the operations described till now in previous embodiments. The image processing system 102 may additionally be able to communicate with a computing device 400 at a user layer, the image processing system 102 itself being at an application or service layer, and further interacts with an image processing server 402 at a server layer of interactions. The layers like user layer, application layer and server layer are used to represent a segregation between different computing components in an image processing ecosystem, which may be facilitated by the image processing system 102.

The image processing system 102 may be accessed by a computing device 400, which may be any special purpose or general-purpose computing device. The computing device 400 may provide an image, such as the original intensity image 101, which needs to be converted to a high-quality DF layered image by the image processing system 102. For example, the computing device 400 may be a navigation device, and the intensity image 101 may be the image of a map to be displayed for a navigation service.

The image processing system 102 comprises the input interface 107, which receives the intensity image 101 from the computing device 400 and transforms it into a high-quality layered DF image by accessing an image processing Application Programming Interface (API) 401. For this, the processor 102a may be configured to generate an API call for an image processing API 401. The image processing API further encapsulates various functions which help in the transformation of the intensity image 101 to a high-quality layered DF image. The API call may in turn be directed to an image processing server 402 which stores various libraries corresponding to diverse types of transformations that can be achieved on the intensity image 101 to obtain the layered DF image comprising an ordered sequence of multiple layers, as has been discussed previously. Each layer comprises a DF procedure for defining DF values at a plurality of locations of the received intensity image 101 and a set of rules for mapping the DF values to intensity values of the respective layer. The DF procedures and the set of rules may be stored in a DFP library 403 on the image processing server. Each DF procedure is associated with a layer in a sequence of multiple layers of the layered DF image, and each DF procedure includes instructions to initialize and iteratively update the DF procedures until a termination condition is met. The API calls are configured to pass image features in the form of a standard API message, to the image processing server 402, and obtain the necessary functions from the DFP library 403 for the image transformation.

Thereafter, the processor 102a may be configured to conduct the instructions or processes specified in the received functions to achieve layer by layer transformations governed by LOD and stopping function, as discussed in previous embodiments. To that end, the processor 102a is configured to receive a response from the image processing server 402, wherein the response comprises one or more necessary functions for obtaining the layered DF image. Subsequently, the layered DF image may be rendered on the output interface 108.

The one or more functions may include an intensity reconstruction function for combining mapped intensities of each layer according to their order in the sequence of layers to reconstruct the received intensity image after transformation. The one or more functions may also include functions to transform the received intensity image by determining an error value associated with a difference between intensities of the received intensity image and an intensity image reconstructed from the layered DF image. Further, the error value is compared with a threshold error value and the reconstructed intensity image is updated based on the comparison. The transformation may be conducted iteratively until the error between the received intensity image and the intensity image reconstructed from the layered DF image by combining intensities values of each level in their corresponding order is less than the threshold error value. The error may be the visualization error including a sum of distances between intensities of pairs of corresponding pixels at corresponding locations in the received intensity image and the reconstructed intensity image.

In some embodiments, the API call further comprises a transformation instruction to transform the layered DF image based on the transformation instruction. The transformation instruction comprises at least one or a combination of (1) a compression parameter, such that the transformed layered DF image includes a compression of the layered DF image, (2) a texture mapping parameter, such that the transformed layered DF image includes the layered DF image with modified texture, (3) a zooming instruction, such that the transformed layered DF image includes a zoomed version of the layered DF image, (4) an algebraic instruction, such that the transformed layered DF image includes a result of algebraic manipulation on the layered DF image.

The image processing server 402 stores various functions libraries including but not limited to an operations library 404 including a collection of functions for carrying out algebraic and other manipulation operations on distance fields in the layered DF image; a brush strokes library 405 including functions to implement DF procedures as a series of brush strokes; a curve fitting library 406 including curve fitting functions; a primitives library 407 for implementing a set of primitives; and a database 408 storing any data related to images, mathematical constants and equations, training data, and the like.

The DFP library 403 may include functions to implement diverse types of procedures, functions to select candidate regions, to determine a new DF procedure for the selected candidate region, to iteratively update DF procedures, to combine DF procedures and the like. The DFP library 403 may also comprise an adaptive DF procedure based on adaptive sampling rate associated with the intensity image 101.

The brush strokes library 405 may include functions for implementing an asymmetric stroke procedure associated with a spline curve. For example, the API call comprises a pen-type data for defining the asymmetric stroke procedure, wherein the pen-type data comprises at least: a pin stroke pen-type option, a pressure-sensitive pen-type option, a customizable pen-type option, a scalable pen-type option, and a textured pen-type option, and corresponding related functions are then retrieved from the brush strokes library 405. The spline curve being associated with a corresponding distance field, and the asymmetric stroke procedure defines a rule for mapping the distance field of the spline curve to a different gradient of intensity change on different sides of a central axis of the spline curve such that intensities of the spline curve vary in a direction perpendicular to its central axis. Such a procedure will further be explained in FIG. 6.

The asymmetric stroke procedure may further be associated with real-time curve fitting operation performed for the spline curve, which may be defined by functions stored in the curve fitting library 406.

To that end, the image processing server 402 provides the necessary functions from different libraries as responses to API calls to implement a method for transforming the intensity image 101 to a layered DF image (such as layered DF image 106 shown in FIG. 1B). The method including receiving the intensity image 101 and generating the API call for transforming the received intensity image 101. The API call being transmitted to the image processing server 402 for transforming the intensity image 101 into a layered distance field (DF) image. The layered DF image comprising an ordered sequence of multiple layers. Each layer in the ordered sequence comprises: a DF procedure for defining DF values at a plurality of locations of the received intensity image, and a set of rules for mapping the DF values to intensity values of the respective layer. The image processing server 402 responds to the API call with a response message from, such that the response comprises one or more functions obtained from the different libraries for obtaining the layered DF image, such that the layered DF image is obtained by transforming intensity image. Once transformation is complete, the layered DF image may be rendered (such as in the form of a working canvas WC or as the reconstructed intensity image, if the stopping condition has been reached).

The image processing server 402 is thus able to provide different libraries for implementing image transformations of high quality, high efficiency, resolution independent and also distributed computing, by maintaining large data separately in the image processing server 402 and accessing it from the image processing system 102 via API calls, as and when required.

Figure 5:
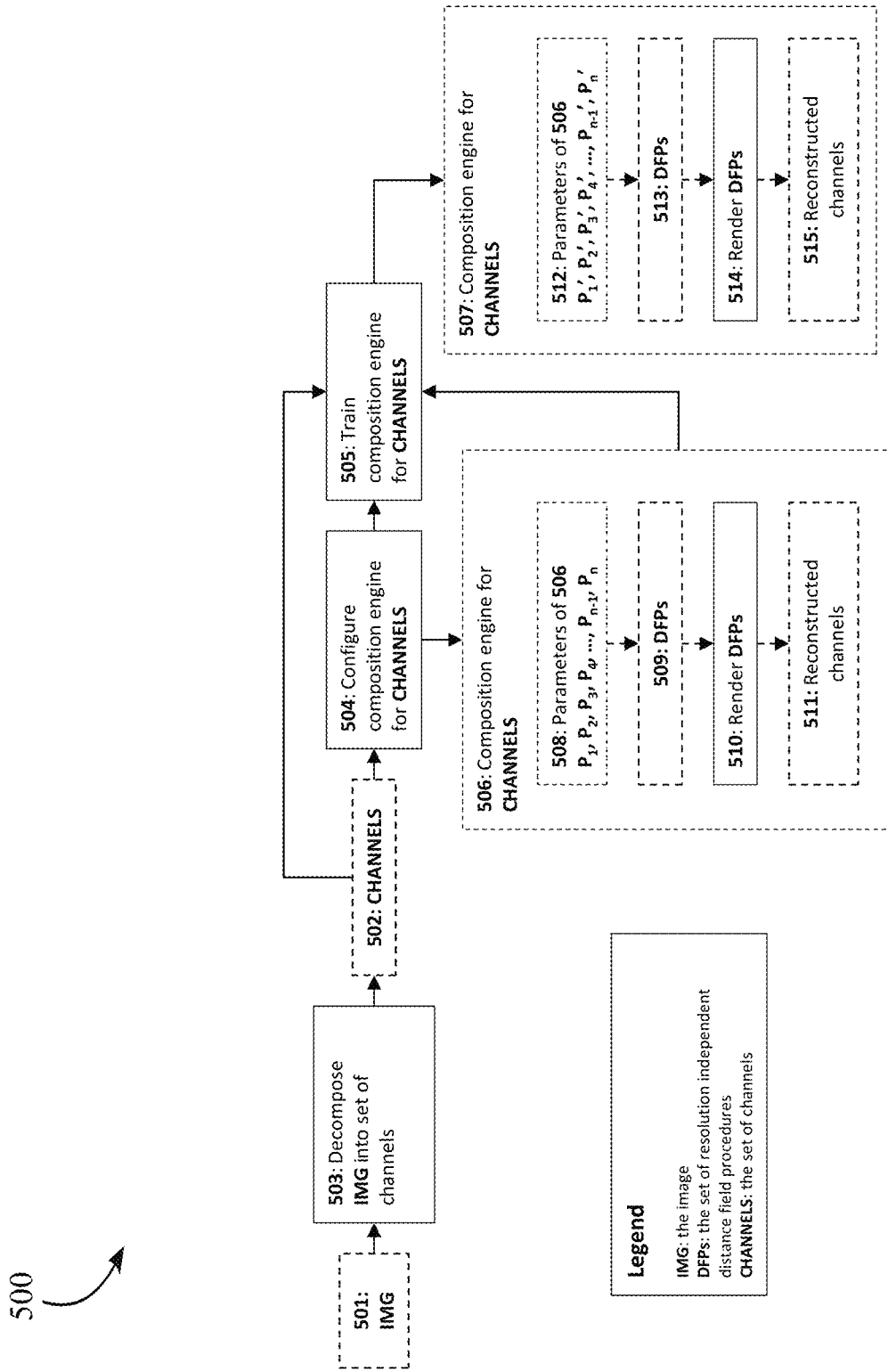
FIG. 5 illustrates a flow diagram of a method for determining a resolution independent transformation for an image, according to some embodiments of the present disclosure.

The image processing system 102 is also configured to provide resolution independent, channel level transformation of images, as illustrated in a method in FIG. 5. FIG. 5 illustrates a flow diagram of a method 500 for determining a resolution independent transformation for an image 501, according to some embodiments. The method 500 comprises, at step 503, decomposing the image 501 into a set of channels 502.

The channels 502 are then used to, at step 504, to configure a composition engine 506 for the set of channels 502, wherein parameters of the composition engine 506, P1, P2, P3, P4, . . . , Pn−1, Pn, determine a set of resolution independent DFPs such that rendering the set of resolution independent DFPS directly reconstructs the set of channels 502. The composition engine may be a module in the processor 102*a* of the image processing system 102, specifically configured for conducting the instructions for implementing resolution independent channels and their transformations as described in this method 500.

The method 500 also includes, at step 505, training the composition engine 506 for configuring the various parameters. To that end, the configuration may further include, at step 508, identifying the resolution independent parameters P1, P2, P3, P4, . . . , Pn−1, Pn. Then, at step 509, determining DFPs corresponding to the resolution independent parameters P1, P2, P3, P4, . . . , Pn−1, Pn. Then, at step 510, rendering the determined DFPs and at step 511, reconstructing the channels 502 from the rendered DFPs. Further, this reconstruction process is fed to the training block 505, and based on the trained composition engine 506, the image may be reconstructed by the trained composition engine 507, as identified in steps 512 to 515. The steps 512 are 515 are same as steps 508 to 511, and include: at step 511, identifying the resolution independent parameters P1, P2, P3, P4, . . . , Pn−1, Pn. Then, at step 513, determining DFPs corresponding to the resolution independent parameters P1, P2, P3, P4, . . . , Pn−1, Pn. Then, at step 514, rendering the determined DFPs and at step 515, reconstructing the channels 502 from the rendered DFPs.

To that end, training 505 the composition engine 506 for the set of channels 502 is doe to adjust the parameters of the composition engine 506 to determine the resolution independent representation of the image 501 by the set of resolution independent DFPs 509 and 513 for the set of channels 502.

To that end, configuring 504 the composition engine 506 for the set of channels 502 is done to determine the set of resolution independent DFPs 509 such that rendering the set of resolution independent DPFs reconstructs the set of channels 503. The reconstruction may be done such as directly from the channels, through a mapping from distance to intensity in linear or nonlinear form.

To that end, the decomposing 503 determines a luminance channel of the image 501, a chrominance channel of the image 501, multiple chrominance channels, a luminance and multiple chrominance channels, performs a color space conversion from a color space of the image to a set of RGB (HSV, HSB, YUV, LAB, LUV, CMYK, and the like) channels, uses the image channels unaltered as the set of channels, wherein the decomposing transforms the image 501 to a frequency domain of channels, to a wavelet domain of channels, and the like. Further, the decomposing 503 may perform a one-time preprocessing of the set of channels 502 to produce preprocessed channel data, wherein the preprocessed channel data includes edge maps, gradient maps, Laplacian maps, zero crossing maps, filtered versions of the set of channels, statistics, and the like, wherein the edge, gradient, Laplacian, and zero crossing maps are determined at a sub-pixel resolution, and the like. Decomposing 503 may further include applying a filtering operation once to the image 501, prior to the decomposing of the image 501 into the set of channels 502, wherein the filtering operation performs a sharpening, a denoising, and the like (to compensate for (to compliment the) rendering characteristics of the set of resolution independent DFPs 509.

The composition engine 506 may be implemented as one of: a procedure, a neural network, or a composition of procedures. The composition may be static during training or may be dynamic during training, wherein each procedure in the composition of procedures determines an element (also a subset of elements) in the set of resolution independent DFPs, wherein each procedure in the composition of procedures determines a portion of an element (also a portion of a subset of elements) in the set of resolution independent DFPs, wherein the portion is a set of operations (e.g., Boolean, blending, arithmetic, etc.) acting on a set of distance fields or a set of locations for the set of distance fields.

In some embodiments, configuring 504 and training 505 are performed separately for each channel of the set of channels, wherein the configuring (training) is performed once for the set of channels 502 and uses the preprocessed channel data to perform its function.

To that end, the training 505 uses a rendering of the set of resolution independent DFPs 509 or the rendering of the image 501, or both of these, at a set of viewpoints to adjust the parameters of the composition engine 506. The viewpoint dependent versions of the set of resolution independent DFPs (and the image) are used by a method, such as the method 123 or 212*a*. guided by an error metric to adjust the parameters of the composition engine 506. The viewpoint determines scale, translation, rotation, and the like, wherein a single viewpoint is used during the training in a viewpoint independent manner to adjust the parameters of the composition engine 506. The various means are used to adjust the parameters of composition engine 506 including trial and error, range enumeration, grid search, cell search, random search, divide-conquer-combine search, or a combination thereof. To that end, the training may progressive (coarse to fine) in nature, multi-resolution in nature, SIMD in nature, and the like, in order to minimize the size of the set of resolution independent DFPs.

To that end, purpose of the training is to select, for each resolution independent DFP in the set of resolution independent DFPs 509: a subset of the parameters of the composition engine, a set of operations (e.g., Boolean, blending, arithmetic, etc.) to act on a set of distance fields such that the distance fields taking on various forms including strokes, filled regions, textured regions, gradients, edges, parameterized templates (of all kinds for matching regions of the image including noise (at different amplitudes, orientations, and frequencies), textures, and the like). The distance fields may be detail directed, regularly sampled, procedural, analytic, distances stored in a memory, and the like.

In an example, the image 501 is decomposed into a set of channels in the LAB color space. Thereafter, for configuring 504 the composition engine 507 for the set of channels 502 a separate composition engine 506 for L and for AB channels is trained. The first layer of the composition engine 506 for L comprises a fixed sized set L1 of procedures, wherein each procedure of L1 includes a set of parameters that define a detail directed resolution independent DFPs 509 which can capture low frequency components of the image 501. The second layer of the composition engine 506 for L comprises a fixed sized set L2 of procedures, wherein each procedure of L2 includes a set of parameters that define a detail directed resolution independent distance field procedure 509 which can capture slightly higher frequency components of the image 501 than those modeled by L1. L2 receives the output of L1, wherein the procedures of L1 are combined in a distance field specific manner (e.g., Boolean combination, blending combination), which is determined during training 505, to produce the output for L2 to consume. The composing of layers continues is this fashion until the final layer Ln is configured to capture the high frequency components of the image 501, wherein the output of Ln is a reconstruction of the L channel for the image 501. A similar setup is repeated for the AB channels. The number of procedures for each layer L1, L2, . . . , Ln can be tuned to the needs of the application for its intended use, wherein more procedures per layer allow a better overall reconstruction of the image 501. The number of procedures per layer can also be dynamically determined during the training step rather than remaining static. While training the composition engine for the set of channels the parameters of the composition engine for L and AB channels are individually adjusted. Correspondingly, using an optimization method, an L2 error metric between the image 501 and a rendering of the set of detail directed resolution independent distance field procedures at multiple viewpoints is adjusted.

In this manner, the image processing system 102 may implement the method 500 for transforming an image solely based on its channels.

Figure 6:
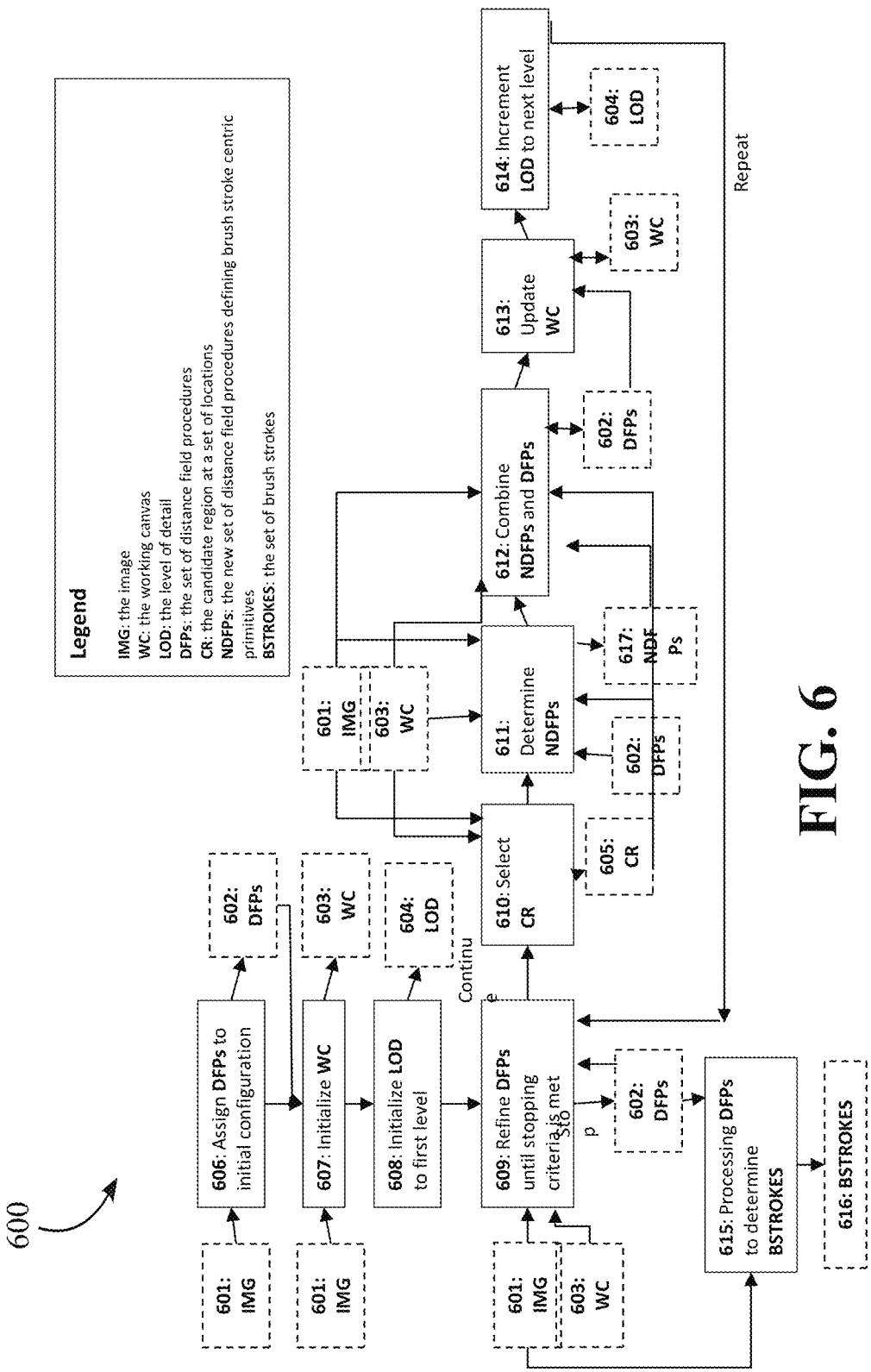
FIG. 6 illustrates a flow diagram of the method for transforming an image using brush strokes-based procedures, according to some embodiments of the present disclosure.

Another possible image transformation is by mimicking a painting process, in the form of brush strokes, as illustrated in method 600 in FIG. 6.

FIG. 6 illustrates a flow diagram of the method 600 for transforming an image using brush strokes-based procedures, according to some embodiments. The functions for implementing the method 600 may be provided in the brush strokes 405 library, shown in FIG. 4.

Brush strokes are a sequence of points with attributes, a path with attributes, a centerline with attributes, a sweep with attributes, a set of curves with attributes, or a set of distance field procedures with attributes. The attributes may include such as a width, a profile, a distance field procedure, a stamp, a pressure, a color, a luminance value, a chrominance value, an opacity, a noise level, texture data, time data, arc length data, and the like, wherein the path includes move to, line to, and curve to commands. The centerline of the brush stroked is defined by a sequence of points, a path, a set of curves, wherein brush strokes produce positive and negative values to enable modeling both drawing and erasing on the working canvas.

Brush stroke centric primitives are more readily converted to an equivalent set of brush strokes (e.g., edges and gradients). These primitives resemble brush strokes, that when combined produce the same types of primitives (in mathematical parlance, a closed set on a set of combining operations such as distance fields and the Boolean operations that combine them). These primitives may take on various forms including edges, gradients, solid regions, textured regions, strokes, parameterized templates (of all kinds for matching regions of the image including noise (at different amplitudes, orientations, and frequencies), textures, and the like), detail directed distance fields, regularly sampled distance fields, procedural distance fields, analytic distance fields, distances stored in a memory, and the like.

The method 600 comprises an image 601 to a set of brush strokes B STROKES 616, such that rendering the set of brush strokes 616 progressively reconstructs the image. The method 600 includes, at step 606, assigning a set of DFPs 602 to an initial configuration. Then, at step 607, a working canvas WC 603 is initialized. Further, at step 608, a level of detail LOD 604 is set to a first level.

Further, at step 609, the set of DFPs 602 is iteratively refined, based on the image 601 and the WC 603, until a stopping criteria is met. The iterative refinement in done on the basis of steps 610-614. At step 610, a candidate region CR 605 of the image 601 is selected at a set of locations where the image differs from the working canvas WC 603. Further, at step 611, a new set of distance field procedures NDFPs 617 is determined from the candidate region and the set of locations at the level of detail defined by LOD 604. The NDFPs 617 define brush stroke centric primitives, provided by the B STROKES 616. Then, at step 612, the NDFPs 617 are combined with DFPs 602 (such as by appending or replacing).

After this, at step 613, the WC 603 is updated by rendering the set of distance field procedures DFPs 602 and at step 614, the LOD 604 is increment to a next level.

Further, the iteration returns to step 609, where the stopping condition is checked. If the stopping condition is reached, then the brush stroke centric primitives BSTROKES 616 of the set of DFPs 602 are processed to determine the set of brush strokes, wherein rendering the set of brush strokes progressively reconstructs the image 601.

To convert the image 601 to a set of brush strokes at step 615, the image 601 is first converted to a constrained set S of distance field procedures and then the set of brush strokes from S are determined. This indirect two step approach more information (i.e., is information rich) and therefore is more able and simpler to convert to the set of brush strokes than the prior art methods of inferring the set of brush strokes directly from pixels of the image.

Brush strokes have several properties that make them an ideal candidate for representing images: 1) they are 1D in nature and therefore faster to render than the more common and more complex 2D forms such as triangles; 2) the points that define them exhibit strong coherency and therefore are subject to better compression; 3) their style can be altered from one form (e.g., pencil) to another form (e.g., paint brush) to achieve different looks and effects for various applications such as movie production and games; 4) they can be easily transformed to distance fields, which are SIMD in nature, and then efficiently processed (e.g., rendered, selected, transformed, stylized) on a GPU by exploiting the structure of the fragment SIMD pipeline on the GPU; and 5) once determined by our invention, they can be physically drawn on a canvas for art production.

These brush strokes may then be subjected to various forms of processing, including, but not limited to edge following, smoothing, curve fitting, attribute fitting, region filling, template fitting, distance field fitting, sampling the image, optimization, greedy search, greedy stepwise optimization, trial and error search, random search, divide-conquer-combine search, and the like.

Such processing of brush strokes and their use for rendering of images by the image processing system 102, provides a more intuitive image transformation method, which resembles closely with real world painting process.

Figure 7:
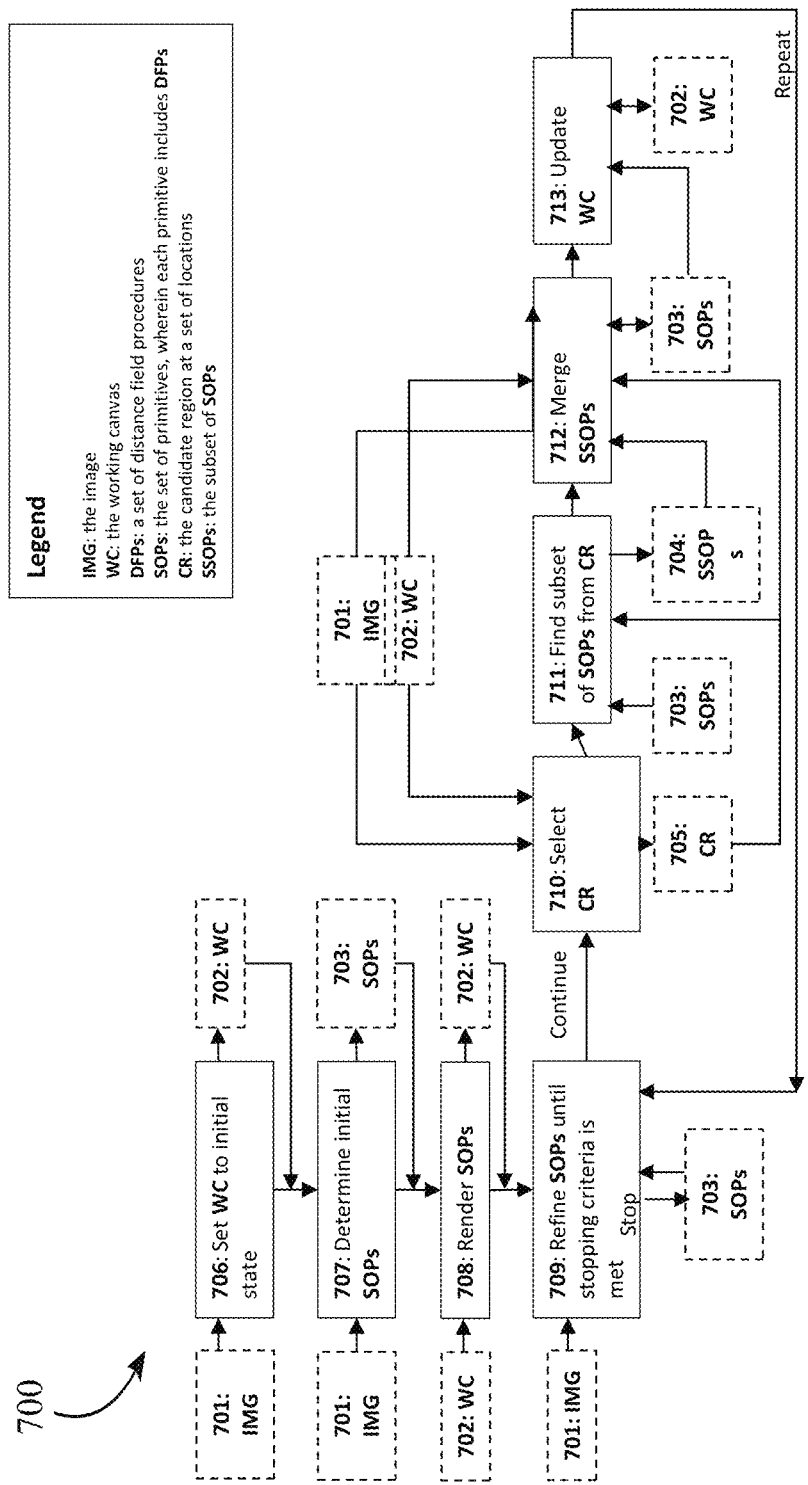
FIG. 7 illustrates a flow diagram of a method for converting an image using a set of primitives, according to some embodiments of the present disclosure.

Another application of the image processing system 102 is to convert an image to a set of primitives, as illustrated in FIG. 7.

FIG. 7 illustrates a method 700 for converting an image 701 to a set of primitives SOPs 703, each primitive in the set of primitives including a set of distance field procedures, wherein rendering the set of primitives reconstructs the image 701. The primitives may include such as brush strokes, solid regions, textured regions, edges, gradients, and the like.

The method 700 comprises, at step 706, setting a working canvas WC 702 to an initial state. The initial state may be such as a blank (i.e., empty) state, a constant color (e.g., equal to the average color of the image, a common color of the image) state. The setting may include various means to define a starting point for the working canvas such as interpolation, regression, optimization, search, filtering, and the like, wherein the starting point includes auxiliary data. The auxiliary data is stored along with the set of primitives SOPs 703 to enable the reconstruction of the image 701. The auxiliary data may be a compressed version of the image 701, a low-resolution version of the image 701, an approximation of the image 701, an interpolation of the image 701, and the like.

Then, at step 707, an initial SOPs 703 is determined. In some examples, when the working canvas is set to blank, a particular primitive to approximate each pixel in the image 701 is selected and that particular primitive is added to SOPs 703. The image 701 is decomposed into a set of regions covering the image 701 and for determining the initial SOPs 703, a particular set of primitives is selected to approximate each region in the set of regions and further adding the particular set of primitives to the SOPs 703.

In another example, when the working canvas WC 702 is set to a non-blank state (e.g., set to a low-resolution version of the image as a starting point), a difference image is generated as a difference between the image 701 and the WC 702. Then, for determining the SOPs 703, a particular primitive is selected to approximate each pixel in the difference image, the particular primitive is added to the set of primitives, and the difference image is decomposed into a set of regions covering the difference image. Then a particular set of primitives is selected to approximate each region in the set of regions and the particular set of primitives is added to the set of primitives SOPs 703.

Then, step 708, the SOPs 703 are rendered to the working canvas. Further from step 709, the SOPs 703 are refined until a stopping condition is met. The refining comprises, at step 710, selecting a candidate region CR 705 at a set of locations where the image 701 is similar to the working canvas WC 702. Then, at step 711, finding a subset of primitives SSOP 704 from the CR 705 and the set of locations.

Thereafter, at step 712, the subset of the set of primitives is merged to reduce a size of the set of primitives SOPs 703. The merging combines sets of distance field procedures corresponding to primitives in the subset of the set of primitives SSOPs 704. Merging exploits the computational advantages of distance fields to perform various operations that are complex, difficult, slow, and sometimes impossible to do with other representations including blends, Booleans, offsets, sweeps, and morphs. The merging blends the sets of distance field procedures, such as using any of: Boolean operations, blending operations, arithmetic operations, conditional operations, and the like. Merging further uses a search method to combine the sets of distance field procedures, wherein the search method is guided by an error metric such that the error metric is not permitted to exceed a specified error tolerance during the merging. The search method may be a greedy method, an optimization method, a greedy stepwise optimization method, a curve fitting method, a trial-and-error method, a range enumeration method, a grid-based method, a cell-based method, a random method, a divide-conquer-combine method, or a method that uses a combination of these methods. The search method minimizes a size of the set of primitives while maintaining a specified error tolerance during the merging.

Further, at step 713, the working canvas WC 702 is updated from the SOPs 703, wherein the rendering of the SOPs 703 reconstructs the image 701.

In this manner, the iterations are repeated and the method 700 stops when the stopping condition is met. The method 700 starts with a large set S of primitives that closely match the image 701 and refine S to a smaller set, while maintaining (i.e., not exceeding) a prescribed error tolerance (the stopping condition) between S and the image 701, until the stopping criteria is met.

The successive refinement provided by the method 700 is guided by an error metric using various methods such as greedy, optimization, trial and error, grid search to ensure coverage, cell search to ensure coverage, random search, divide-conquer-combine search, and the like. The error metric may be a local error metric, a global error metric, allowing divergent steps that increase the global error metric using simulated annealing temperature cooling, and the like. The CR 705 in the iterative refinement is determined at a set of locations, wherein the set of locations are locations of minimum error, of slight difference, of high similarity, or a combination thereof. The successive refinement maps a sequence of points to a new sequence of points by applying a refinement rule. The refinement rule typically increases the number of points and produces a smoother sequence. Refinement rules can be adaptive, thereby changing their behavior based on characteristics of a point and its neighbors, among other things. For example, a refinement rule may insert new points in between successive points of the set of data points only if the distance between the successive points exceeds a threshold.

The method 700 may be implemented by the image processing system 102 to provide a highly efficient image transformation method, based on set of primitives derived from the image.

Figure 8:
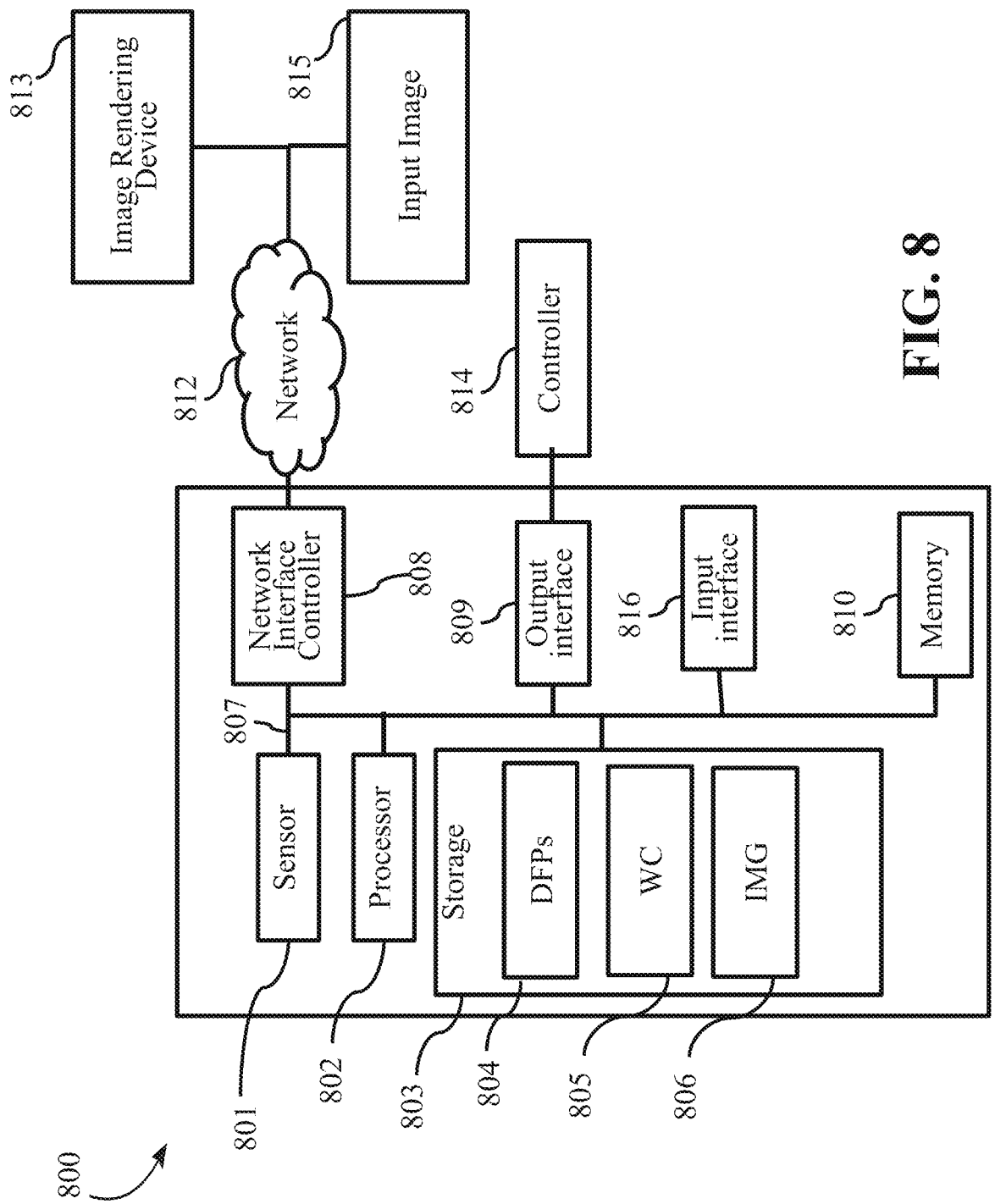
FIG. 8 illustrates a block diagram of a computing system used to implement the various embodiments disclosed herein for transforming an image to a layered DF image, according to some embodiments of the present disclosure.

The various embodiments discussed above may be implemented using a computing system illustrated in FIG. 8.

FIG. 8 illustrates a block diagram of a computing system 800 used to implement the various embodiments disclosed herein for transforming an image to a layered DF image. FIG. 8 is explained in conjunction with FIG. 1A and FIG. 7. The computing system 800 may correspond to the image processing system 102 or the computing device 400. The computing system 800 may have a number of interfaces connecting the computing system 800 with one or more image rendering device(s) 813. For example, a network interface controller (NIC) 808 is adapted to connect the computing system 800, through a bus 807, to a network 812. Through the network 812, either wirelessly or through wires, the computing system 800 may accept an input intensity image 815. Additionally, additional information associated with the input intensity image 815 may be received via an input interface 816. The input interface 816 may connect the computing system 800 to a keyboard and/or a pointing device. For instance, the pointing device may include a mouse, trackball, touchpad, joystick, pointing stick, stylus, or touchscreen, among others. The input interface 816 may also be connected to one or more sensors 801 which capture the input image 815. To that end, the one or more sensors may include a camera.

The computing system 800 includes a processor 802 configured to execute stored instructions, as well as a memory 810 that stores instructions that are executable by the processor 802. The processor 802 may be a single core processor, a multi-core processor, a computing cluster, or any number of other configurations. The memory 810 may include random access memory (RAM), read only memory (ROM), flash memory, or any other suitable memory systems. Further, the computing system 800 may include a storage device 803 adapted to store different modules storing executable instructions for the processor 802, such as the image processing system 102. The storage device 803 may be implemented using a hard drive, an optical drive, a thumb drive, an array of drives, or any combinations thereof.

The storage device 803 is configured to store a set of DFPs 804 and their corresponding rules. Additionally, the storage device 803 may store the working canvas WC at various stages of processing. The storage device 803 may also store the layered DF image IMG 806 at every layer of processing. Additionally, the storage module 803 may store data about level of detail, a set of API related data for generated API calls for an image processing API, an error value related data, and the like. To that end, the storage module 803 may be configured to cause the processor 802 to receive the input image 815 and conduct all the functions of the image processing system 102 disclosed in previous embodiments. This may lead to transformation of the input image 815 into a layered DF image, which may then be reconstructed and rendered via an output interface 809. The output interface 809 may be configured to connect the computing system 800 to an image rendering device 813. For instance, the image rendering device 813 includes a computer monitor, television, projector, or mobile device, among other things.

The computing system 800 may also be configured to implement additional features described below in conjunction with FIG. 9, FIG. 10, FIG. 11, and FIG. 12.

Figure 9:
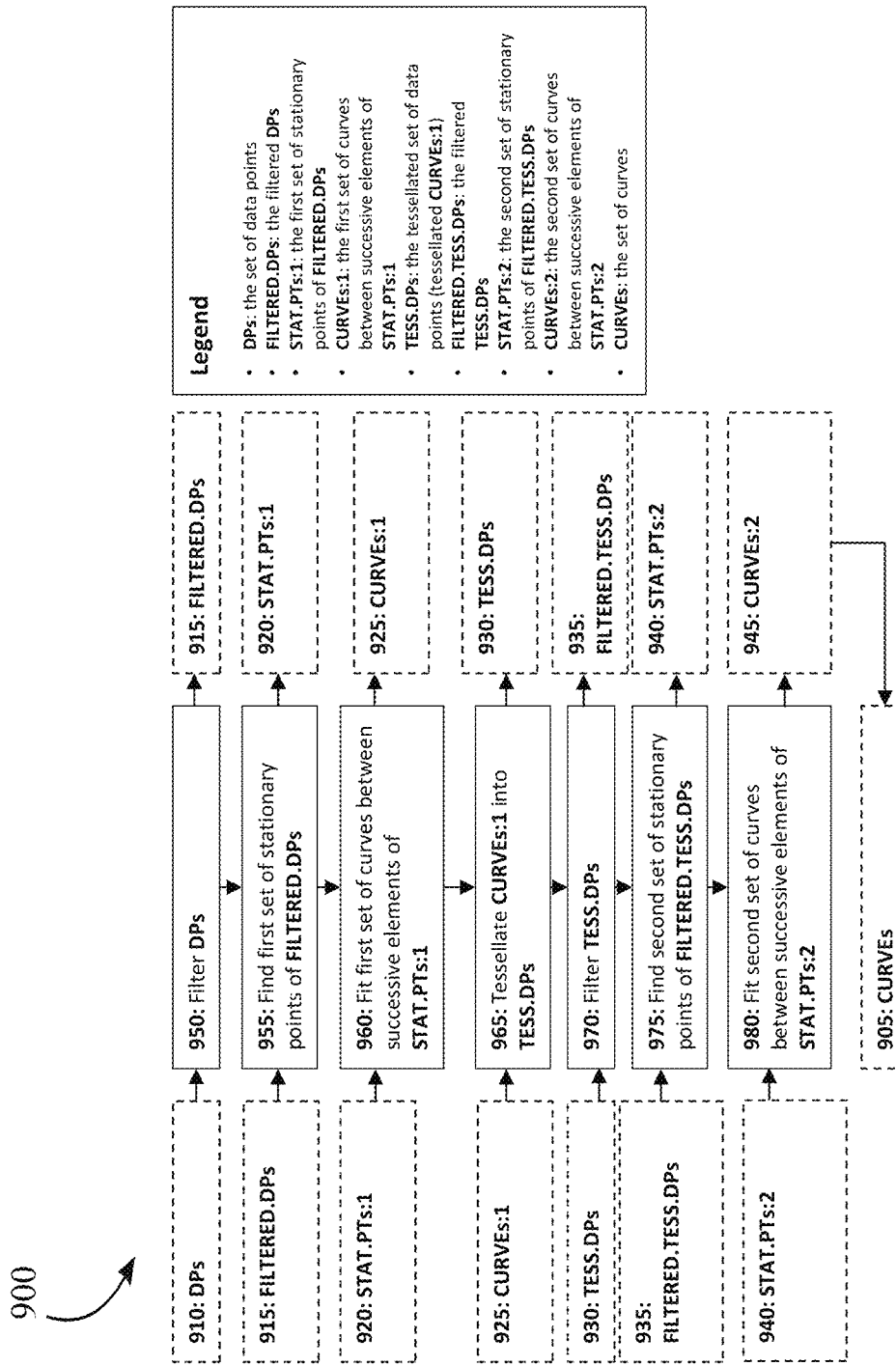
FIG. 9 illustrates a method for curve fitting using the image processing system, according to some embodiments of the present disclosure.

FIG. 9 illustrates a method 900 for curve fitting using the image processing system 102, in accordance with an embodiment of the present disclosure.

In some embodiments, the method 900 may be a computer-implemented method for fitting a set of curves 945 to a set of data points 910. The method 900 includes, at step 950 filtering the set of data points DPs 910 to obtain a set of filtered data points FILTERED DPs 915. Further, at step 955, the method 900 includes finding a first set stationary points STAT.PTs:1 920 from the set of filtered data points FILTERED DPs 915. Further, the method 900 includes at step 960, fitting a first set of curves CURVES:1 925 between successive elements of the first set of stationary points STAT.PTs:1 920 and at step 965, tessellating the first set of curves CURVES:1 925 into a tessellated set of data points TESS.DPs 930. Then, at step 970, the tessellated set of data points TESS.DPs 930 is filtered to find a second set of stationary points of the filtered tessellated set of data points, FILTERED TESS.DPs 935. Further, at step 975, a second set of stationary points STAT.PTs:2 940 from FILTERED TESS.DPs 935 is determined. Further, at step 980, a second set of curves CURVEs:2 945 is obtained by fitting these curves between successive elements of the second set of stationary points STAT.PTs:2 940. To that end, the second set of curves CURVEs:2 945 determine the set of curves fitting the set of data points DPs 910.

A data point includes a set of attributes, wherein an attribute in the set of attributes is a location, a number, a value, a measurement, an ordering, a sequence number, a width, a profile, a distance field procedure, a stamp, a pressure, a color, a luminance value, a chrominance value, an opacity, a noise level, texture data, time data, arc length data, and the like, can be of arbitrary dimension (e.g., 2D, 3D), and the like. The set of attributes include independent and dependent attributes, and the set of curves determine a relationship between the independent and dependent attributes of the set of data points.

Data points in the set of data points that are required to remain unaltered (i.e., their attributes remain in a fixed state during the fitting process are called stationary points. Any point of the set of data points can be labeled as stationary before the fitting method begins (examples include starting and ending data points of the set of data points that identify independent sequences such as independent curves of a digital drawing)

Data points of the set of data points can be dynamically classified as stationary by a procedure during the fitting method, wherein the procedure detects features (performs feature detection), wherein the features include corners, edges, points of local maximum curvature, inflection points, common templates of features, and combinations thereof.

Curves may include such as Bezier curves of various orders (e.g., quadratic, cubic, quartic, etc.), splines of various orders (e.g., quadratic, cubic, quartic, etc.), polynomials of various orders, a mathematical function, a procedure with parameters that produces a set of output values given a set of input values, a set of distance field procedures, combinations of these forms with and without specific constraints imposed upon them that achieve a particular goal such as C1 and C2 continuity, vexels, piecewise variations of these forms to permit long sequences of data points to be properly fit, and the like. A vexel is a cubic Bezier curve C whose first and second off-curve points are constrained such that the perpendicular projection from the first off-curve point of C to a line L between the first endpoint p0 of C and the second endpoint p1 of C intersects L at a distance of ⅓ the length of L from p0 and the perpendicular projection from the second off-curve point of C to L intersects L at a distance of ⅔ the length of L from p0.

Tessellating approximates each curve in the set of curves by another primitive, typically of lower degree or of lower complexity. For example, a tessellation of a cubic Bezier curve (of degree 3) into a sequence of line segments (of degree 1) which closely approximates the cubic Bezier curve, wherein primitives include curves, lines, points, procedures, functions, and the like.

Most geometric smoothing methods suffer from a number of problems. Perhaps the most severe is the shrinkage problem: when the geometric smoothing method is applied iteratively to a shape a large number of times, the shape eventually collapses to a point. Perhaps the most popular geometric smoothing technique is the Gaussian smoothing method, which is performed by a convolution of a set of data points P defining a curve C with a Gaussian filter G. The Gaussian method is known to produce shrinkage. In one embodiment of our invention, we use a two-pass geometric smoothing method to reduce the shrinkage of the curve C defined by the set of data points P, wherein pass 1 computes a smoothed curve G(C) and residuals C−G(C), where G(C) denotes a Gaussian filtered curve C and pass 2 computes G(C)+G(C−G(C)) to determine a smoothed set of data points with reduced shrinkage.

A corner can be defined as the intersection of two edges. A corner can also be defined as a point for which there are two dominant and different edge directions in a local neighborhood of the point. One approach for corner detection follows:

Uses dot product formulation: dot(A,B)=∥A∥∥B∥ cos (angle) A, B are normalized vectors around each candidate point p and points near the beginning and end of each independent sequence in the set of data points are excluded as candidates. Further, normalized vectors around each candidate point p are determined. For this, cos(angle) around candidate point p using the dot product formulation is determined. The angle is compared to a specified tolerance to determine the result (as either of true or false). Some other methods of corner detection include Harris corner detection, Shi-Tomasi corner detection, robust corner detection, a previously trained neural network, and the like.

In some embodiments, filtering the set of data points: performs a non-shrinking smoothing operation to determine the filtered set of data points, performs a smoothing operation, performs a convolution operation, performs a noise reduction operation, performs a moving average operation, performs a corner preserving smoothing operation, performs a successive refinement operation, performs a combination of these operations.

In some embodiments, the successive refinement operation maps the set of data points to a new set of data points by applying a refinement rule, the new set of data points replacing the set of data points, wherein the refinement rule alters (e.g., increases) a size of the set of data points and produces a smoother sequence connecting the points of the set of data points. The refinement rule may be static, or adaptive. The adaptive refinement rule is based on characteristics of a point and its neighbors. The characteristic may be distance, a difference between a particular attribute of the set of attributes of the set of data points, and the like.

Figure 10:
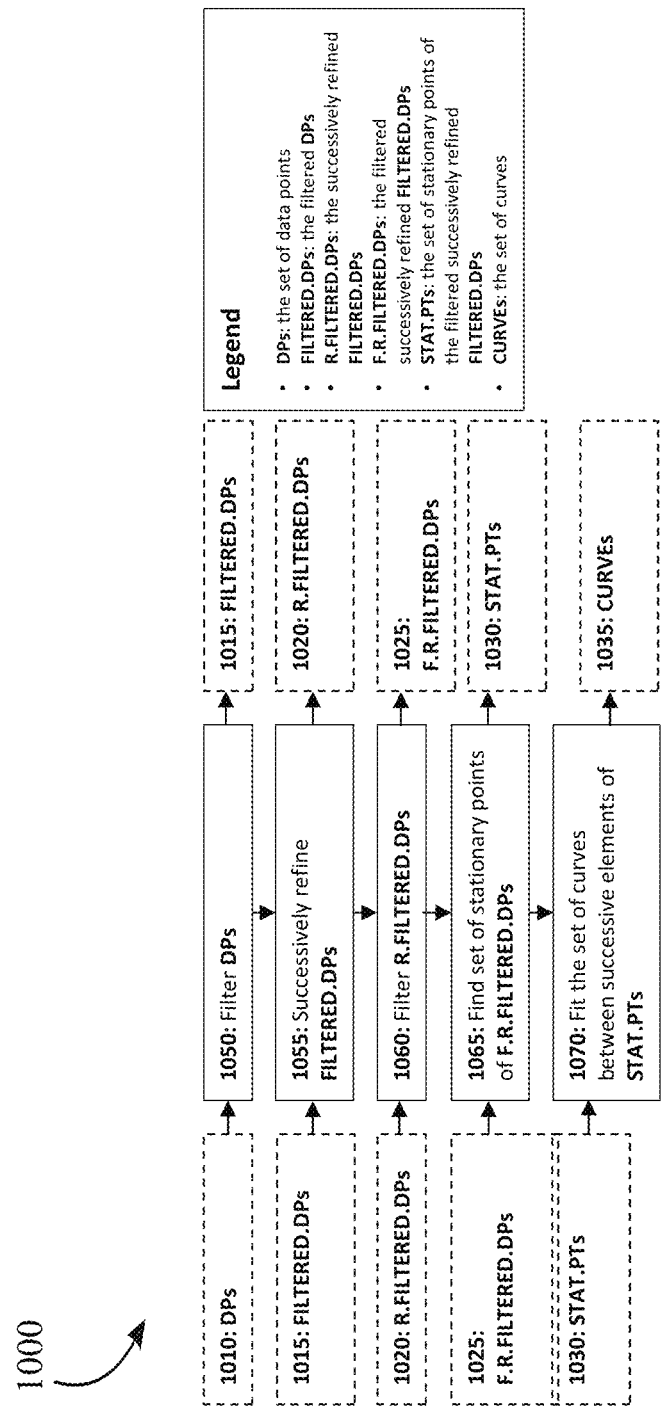
FIG. 10 illustrates a computer-implemented method for performing successive refinement operations on a set of data points for curve fitting, according to some embodiments of the present disclosure.

FIG. 10 illustrates a computer-implemented method 1000 for performing successive refinement operations on a set of data points for curve fitting, in accordance with some embodiments of the present disclosure.

The method 1000 includes, at step 1050, filtering a set of data points DPs 1010, to obtain the filtered set of data points FILTERED DPs 1015. The method 1000 further includes, at step 1055, performing successive refinement operations on the set of filtered data points FILTERED DPs 1015, to obtain a set of successively filtered data points R.FILTERED.DPs 1020. Then, the method 1000 includes, at step 1060, filtering the set of successively filtered data points R.FILTERED.DPs 1020 to obtain a set of filtered successively refined filtered data points F.R.FILTERED.DPs 1025. Further, at step 1065, a set of stationary points STAT.PTs 1030 are found from the filtered successively refined filtered data points F.R.FILTERED.DPs 1025. And finally, at step 1070, a set of curves CURVEs 1035 is fit between successive elements of the set of stationary points STAT.PTs 1030.

In some embodiments, finding the first set (or the second set) of stationary points of the filtered set of data points (the filtered tessellated set of data points) performs a procedure to determine the first set (or the second set) of stationary points, wherein the procedure detects features, like corners, edges, points of local maximum curvature, inflection points, common templates of features, and combinations thereof. The finding identifies data points of the filtered set of data points (the filtered tessellated set of data points) that have been labeled as stationary to determine the first set (the second set) of stationary points.

In some embodiments, tessellating the first set of curves performs a degree reduction (a complexity reduction) of the first set of curves to determine the tessellated set of data points, decomposes the first set of curves into a sequence of approximating line segments (approximating lower degree curves, approximating data points) to determine the tessellated set of data points, performs a recursive subdivision on the first set of curves to determine the tessellated set of data points. The degree reduction (the decomposing, the recursive subdivision) includes an error tolerance (where error is measured as the difference between the tessellation and the first set of curves) and the tessellating continues until the error tolerance is satisfied (typically until the tessellation closely approximates the first set of curves).

In some embodiments, fitting the first set (the second set) of curves between successive elements of the first set (the second set) of stationary points first identifies a subset of the filtered set of data points (the filtered tessellated set of data points) between each pair of successive elements of the first set (the second set) of stationary points and then performs a fitting operation on the subset of the filtered set of data points (the filtered tessellated set of data points) to determine fit curves to add to the first set (the second set) of curves.

The fitting operation may include: a linear regression method, a nonlinear regression method, a least squares method, an optimization method, a robust regression method, a pre-trained neural network regression method, first determining a distance field from the subset of the filtered set of data points (the filtered tessellated set of data points) and second using the distance field to deform a set of candidate curves to fit the subset of the filtered set of data points (the filtered tessellated set of data points) and third assigning the deformed set of candidate curves to the fit curves; wherein the deforming of the set of candidate curves samples the distance field to determine an error metric. The error metric may be used to move and reshape the set of candidate curves, wherein the determining the distance field from the subset of the filtered set of data points (the filtered tessellated set of data points) first constructs an approximation to the subset of the filtered set of data points (the filtered tessellated set of data points) and then determines the distance field from the approximation, wherein the approximation is a polyline connecting the subset of the filtered set of data points (the filtered tessellated set of data points), wherein the approximation is a polyline connecting a successive refinement of the subset of the filtered set of data points (the filtered tessellated set of data points), wherein the approximation is a set of curves connecting the subset of the filtered set of data points (the filtered tessellated set of data points).

In some embodiments, the filtering the tessellated set of data points performs an operation to determine the filtered tessellated set of data points. The operations may include a smoothing operation, a convolution operation, a non-shrinking smoothing operation, a noise reduction operation, a moving average operation, a corner preserving smoothing operation, a successive refinement operation, or a combination of these operations.

In some embodiments, viewpoint dependent fitting defines a subset of these steps (e.g., filtering and tessellating) that are be viewpoint dependent. Viewpoint dependent fitting can provide distinct advantages (e.g., faster performance and higher quality) for some applications. A viewpoint determines the viewing characteristics (e.g., scale, rotation, translation, resolution, and the like) of how the set of data points will be viewed. Examples of viewpoint dependence follows. When tessellating, the scale (i.e., zoom level) of the viewpoint can be used to moderate how fine of a tessellation is performed: as the viewpoint zooms in on the set of data points, the tessellation becomes finer and as the viewpoint zooms out on the set of data points, the tessellation becomes coarser. Likewise, when filtering, the scale of the viewpoint can be used to moderate how the filtering is performed: as the viewpoint zooms in on the set of data points, the filtering uses less points in the set of data points and as the viewpoint zooms out on the set of data points, the filtering uses more points in the set of data points.

For example, in an embodiments, curve type may be vexels; each data point comprises a 3 tuple of x, y, and pen pressure for a digital drawing application. Filtering the set of data points may include non-shrinking smoothing filter. Further, for filtering a first set of stationary points of the filtered set of data points is identified to identify corners as stationary points using the dot product formulation. Then, fitting a first set of curves between successive elements of the first set of stationary points is done. For fitting, vexels can be directly fit to the data points between successive elements in a single step by using its definition (no iterative regression method is required with vexels). Further, tessellating is done to fit the first set of curves into a tessellated set of data points by recursive subdivision of the vexels into line segments. The tessellated set of data points are filtered using a Gaussian smoothing filter. Further, a second set of stationary points of the filtered tessellated set of data points is identified. This is done by identifying corners as stationary points using the dot product formulation. Further, a second set of curves are fitted between successive elements of the second set of stationary points. For this, vexels can be directly fit to the data points between successive elements in a single step by using its definition (no iterative regression method is required with vexels).

In some embodiments, a computer-implemented method for incrementally fitting a set of curves to a sequence of data points is provided.

Figure 11:
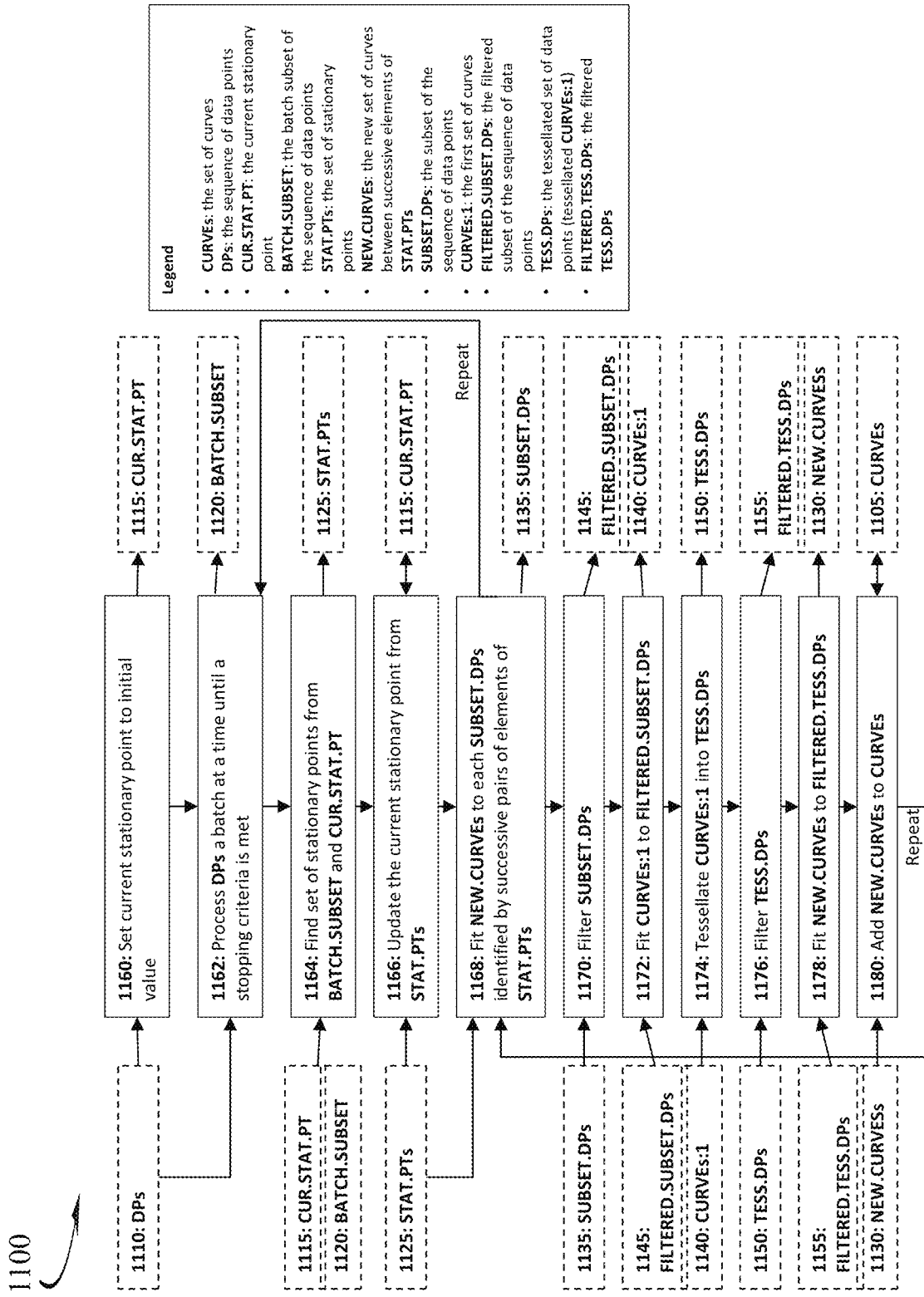
FIG. 11 illustrates a method for incrementally fitting a set of curves to a sequence of data points, according to some embodiments of the present disclosure.

FIG. 11 illustrates such a method 1100 for incrementally fitting a set of curves CURVEs 1105 to a sequence of data points DPs 1110. The method 1100 may comprise at step 1160, setting a current stationary point CUR.STAT.PT 1115 to an initial value. Then, at step 1162, processing the sequence of data points DPs 1110, a batch at a time, until a stopping criteria is met. The batch comprising a batch subset of the sequence of data points BATCH.SUBSET 1120. The batch processing further comprising: at step 1164, finding a set of stationary points STAT.PTs 1125, from the batch subset BATCH SUBSET 1120, of the sequence of data points DPs 1110 and the current stationary point CUR.STAT.PT 1115; at step 1166, updating the current stationary point CUR.STAT.PT 1115 from the set of stationary points STAT.PTs 1125; and at step 1168, fitting a new set of curves NEW CURVEs 1130 to each subset of the sequence of data points SUBSET.DPs 1135, identified by successive pairs of elements of the set of stationary points STAT.PTs 1125. Fitting the new set of curves further comprising: at step 1170, filtering the subset of the sequence of data points SUBSET.DPs 1135; at step 1172, fitting a first set of curves CURVEs:1 1140 to the filtered subset of the sequence of data points FILTERED.SUBSET.DPs 1145; at step 1174 tessellating the first set of curves CURVEs:1 1140 into a tessellated set of data points TESS.DPs 1150; at step 1176, filtering the tessellated set of data points TESS.DPs 1150 to obtain filtered tessellated data points FILTERED TESS.DPs 1155; at step 1178 fitting the new set of curves NEW CURVEs 1130 to the filtered tessellated set of data points FILTERED TESS.DPs 1155, and at step 1180, adding the new set of curves NEW CURVEs 1130 to the set of curves CURVEs 1105, wherein the set of curves CURVEs 1105 fit the sequence of data points processed thus far.

Some embodiments provide the interactive incremental curve fitting component required for a digital drawing system. In such a system, as an artist draws with a tablet, data points with pen pressure are generated. The data points are typically processed, and curve fit a small batch (e.g., 5 points) at a time to give the artist immediate visual feedback during drawing. Processing and curve fitting after every data point can be too computationally taxing for some systems, thereby requiring the need to batch data points into small subsets. Each batch of data points are curve fit and integrated into the previously determined curves derived from the previous batches. Curve fitting begins upon a pen down event and is terminated during a pen up event. For such a process a first point in the sequence of data points is set to null. The sequence of data points is terminated when stopping condition is met, such as upon some event like a pen up event occurs, a time limit is exceeded, a maximum iteration count is exceeded, an error tolerance is met, a lack of convergence over a sequence of processing steps occurs, data independent, data dependent, dynamically updated, static, controlled by visual inspection, by human guidance, by an AI, determined by a procedure, determined by a table, or the like.

In some embodiments, the set of stationary points from the batch subset of the sequence of data points is found and the current stationary point and the updating the current stationary point from the set of stationary points is done using a state machine. In general, a state machine is any device that stores a status of something at a given time and can operate on input to change the status and/or cause an action or output to take place for any given change. More formally, a state machine can be described as: an initial state or record of something stored someplace, a set of possible input events, a set of new states that may result from an input event, and a set of possible actions or output events that result from a new state.

In some embodiments, updating the current stationary point from the set of stationary points assigns the current stationary point to a last stationary point of the set of stationary points.

Some embodiments provide a method for rendering an ordered set of primitives using a depth buffer, wherein each primitive of the ordered set of primitives defines a composite shape determined by a set of Boolean operations operating on a set of distance fields.

Figure 12:
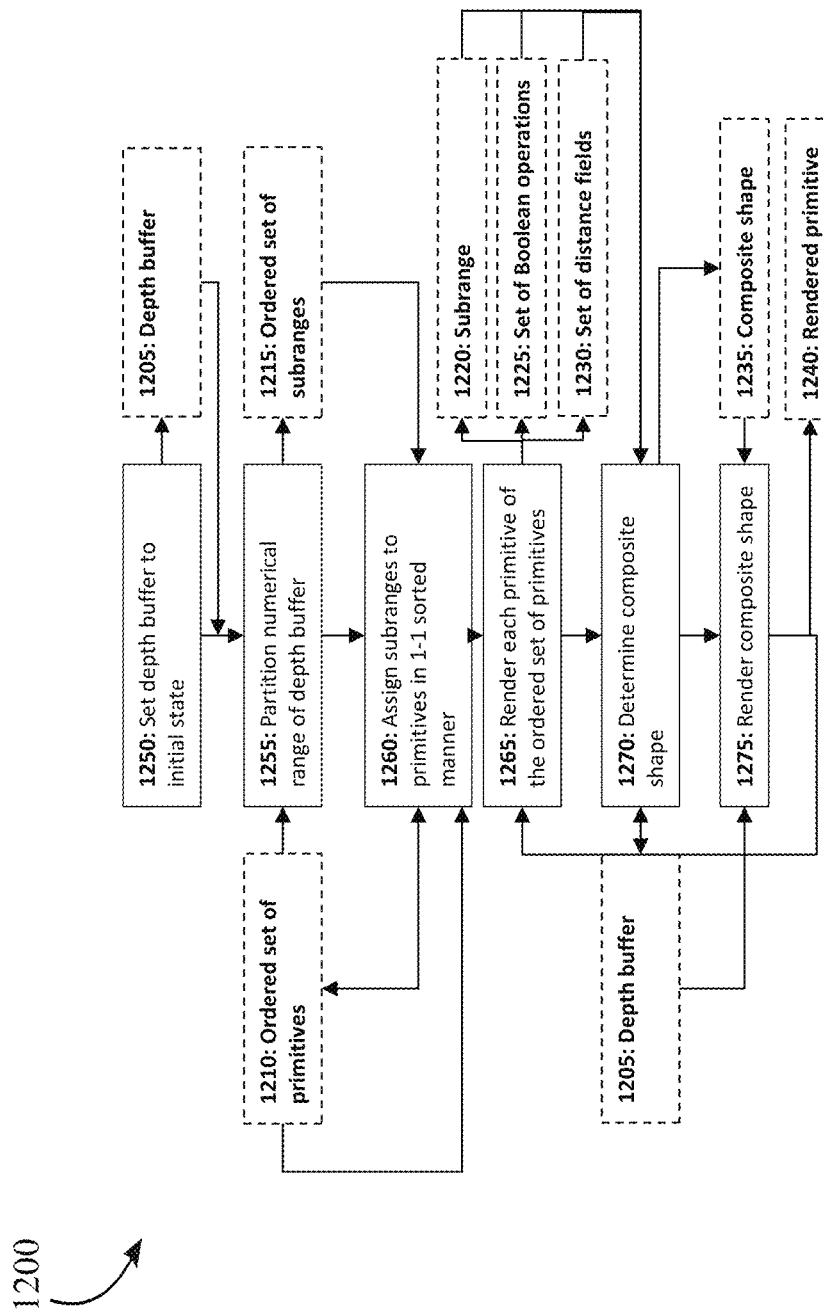
FIG. 12 illustrates a method for rendering an ordered set of primitives using a depth buffer, according to some embodiments of the present disclosure.

FIG. 12 illustrates a method 1200 for rendering an ordered set of primitives using a depth buffer 1205. The method 1200 may be implemented by a processor configured for executing operations of the method 1200, the operations comprising: at step 1250, setting the depth buffer 1205 to an initial state. The operations further comprising, at step 1255 partitioning a numerical range of the depth buffer 1205 into an ordered set of subranges 1215. The operations of the method 1200 further comprising, at step 1260, assigning a subrange of the ordered set of subranges 1215 to each primitive of the ordered set of primitives in a one-to-one sorted manner. Further, the operations comprising, at step 1265, rendering, in order, each primitive of the ordered set of primitives 1210, the primitive having a subrange 1220, a set of Boolean operations 1225, and a set of distance fields 1230. The method 1200 further comprising: at step 1270, determining a composite shape 1235 of the primitive from the subrange 1220, the set of Boolean operations 1225, and the set of distance fields 1230 using the depth buffer 1205 and rendering the composite shape 1235.

A depth buffer comprises a memory buffer and a processor that operates on the memory buffer. The processor may be a CPU, a GPU, and the like. The depth buffer comprises a z-buffer of a GPU that may be dynamic, has a numerical range, includes addressable elements (e.g., fragments, pixels), performs Boolean operations on the addressable elements, performs arithmetic operations on the addressable elements, operates in parallel on the addressable elements and the like. The Boolean operations include union, intersection, and subtraction operations, wherein the union, intersection, and subtraction operations are decomposed into a set of min and max operations, wherein the depth buffer operates in a SIMD manner.

The embodiments disclosed herein avoid the clearing of the depth buffer for each primitive in the set of ordered primitives by partitioning the numerical range of the depth buffer into a set of subranges, typically one subrange for each primitive, and reformulates the Boolean operations and the range of the set of distance fields defining the primitive to operate strictly in that subrange in such a way to ignore all previous values assigned to the depth buffer when rendering previous primitives in the set of ordered primitives in the required order. This improves computing efficiency significantly by removing the penalty levied for clearing of the depth buffer, as is done in the solutions of existing art.

In some embodiments, the numerical range of the depth buffer extends from a first value to a second value, wherein the first value is less than the second value, and wherein the setting assigns the first value to 0 and the second value to 1. The setting may assign the depth buffer to the first value, wherein a subrange in the ordered sequence of subranges is a subset of the numerical range, wherein the subrange has a first subrange value and a second subrange value, wherein the first subrange value is less than the second subrange value.

In some embodiments, the partitioning divides the numerical range of the depth buffer into the ordered sequence of subranges by splitting the numerical range into N subranges, wherein N is equal to a total number of primitives in the ordered sequence of primitives. The numerical range of the depth buffer may also be divided into N numerically increasing subranges or into N numerically decreasing subranges.

In some embodiments, determining of the composite shape uses the depth buffer to perform the set of Boolean operations on the set of distance fields within the subrange. The determining reformulates the Boolean operations and the range of the set of distance fields defining the primitive to operate strictly in the subrange in such a way to ignore all previous values assigned to the depth buffer when rendering previous primitives in the ordered sequence of primitives in the required order.

In some embodiments, the rendering uses the depth buffer resulting from the determining of the composite shape to render the composite shape. For example, an ordered set of four primitives A, B, C, and D may require rendering. They are each composed of Boolean union operators from which their composite shapes can be determined. According to embodiments disclosed herein, firstly, the depth buffer is initialized to the numerical range 0 to 1 and maximum values for forthcoming operations applied to the fragments of the depth buffer are retained. The primitive A may be assigned to the subrange starting at 0.00 and ending at 0.25, primitive B may be assigned to the subrange starting at 0.25 and ending at 0.50, primitive C may be assigned to the subrange starting at 0.50 and ending at 0.75, and primitive D may be assigned to the subrange starting at 0.75 to ending at 1.00.

Further, for this example, rendering then proceeds as follows. The depth buffer is cleared once. Then the set of distance fields for primitive A are programmed to operate in its assigned subrange [0.00, 0.25] and to compute its composite shape by using maximum operations in conjunction with the depth buffer setting of retaining maximum values. The primitive A is then rendered using the composite shape in the depth buffer. Further the set of distance fields for primitive B are programmed to operative in its subrange [0.25, 0.50] and to compute its composite shape by using maximum operations in conjunction with the depth buffer setting of retaining maximum values. Note that every distance value that primitive B determines is greater than every distance value made while processing primitive A; consequently, the distance values for the previously rendered primitive A have no effect on computing the composite shape for primitive B and therefore do not need to be cleared before processing primitive B. Then primitive B is rendered using the composite shape in the depth buffer. The same steps for primitive C and primitive D achieve progressive rendering of the primitives.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination may correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications may be made within the spirit and scope of the present disclosure. Therefore, it is the aspect of the appended claims to cover all such variations and modifications as come within the true spirit and scope of the present disclosure.

The invention claimed is:

1. An image processing system, comprising:
 an input interface configured to receive an intensity image;
 at least one processor configured to execute computer-executable instructions to:
  generate an application programming interface (API) call for transforming the received intensity image;
  transmit the API call to an image processing server for transforming the intensity image into a layered distance field (DF) image, wherein the layered DF image comprises an ordered sequence of multiple layers,
   wherein each layer in the ordered sequence comprises: a DF procedure for defining DF values at a plurality of locations of the received intensity image; and
   a set of rules for mapping the DF values to intensity values of the respective layer;
  receive a response from the image processing server, wherein the response comprises one or more functions for obtaining the layered DF image, such that the layered DF image is obtained by transforming intensity image; and
 an output interface configured to render the layered DF image.

2. The image processing system of claim 1, wherein the one or more functions include an intensity reconstruction function for combining mapped intensities of each layer according to their order in the sequence of layers to reconstruct the received intensity image after transformation.

3. The image processing system of claim 1, wherein transforming the received intensity image by the image processing server further comprises:
 determine an error value associated with a difference between intensities of the received intensity image and an intensity image reconstructed from the layered DF image;
 compare the error value with a threshold error value; and
 update the reconstructed intensity image based on the comparison.

4. The image processing system of claim 3, wherein the intensity image is transformed iteratively until the error between the received intensity image and the intensity image reconstructed from the layered DF image by combining intensities values of each level in their corresponding order is less than the threshold error value.

5. The image processing system of claim 4, wherein the error is a visualization error including a sum of distances between intensities of pairs of corresponding pixels at corresponding locations in the received intensity image and the reconstructed intensity image.

6. The image processing system of claim 1, wherein the API call comprises a transformation instruction to transform the layered DF image based on the transformation instruction.

7. The image processing system of claim 6, wherein the transformation instruction comprises at least one or a combination of (1) a compression parameter, such that the transformed layered DF image includes a compression of the layered DF image, (2) a texture mapping parameter, such that the transformed layered DF image includes the layered DF image with modified texture, (3) a zooming instruction, such that the transformed layered DF image includes a zoomed version of the layered DF image, (4) an algebraic instruction, such that the transformed layered DF image includes a result of algebraic manipulation on the layered DF image.

8. The image processing system of claim 1, each DF procedure is associated with a layer in a sequence of multiple layers of the layered DF image, and each DF procedure includes instructions to initialize and iteratively update the DF procedures until a termination condition is met.

9. The image processing system of claim 8, iteratively updating the DF procedure comprises:
   select a candidate region of the received intensity image;
   determine a new DF procedure for the selected candidate region; and
   combine the new DF procedure with a sequence of past DF procedures.

10. The image processing system of claim 9, wherein at least one DF procedure comprises an asymmetric stroke procedure associated with a spline curve, wherein the spline curve is associated with a corresponding distance field, and wherein the asymmetric stroke defines a rule for mapping the distance field of the spline curve to a different gradient of intensity change on different sides of a central axis of the spline curve such that intensities of the spline curve vary in a direction perpendicular to its central axis.

11. The image processing system of claim 10, wherein the asymmetric stroke procedure comprises real-time curve fitting operation performed for the spline curve.

12. The image processing system of claim 11, wherein the API call comprises a pen-type data for defining the asymmetric stroke procedure, wherein the pen-type data comprises at least: a pin stroke pen-type option, a pressure-sensitive pen-type option, a customizable pen-type option, a scalable pen-type option, and a textured pen-type option.

13. The image processing system of claim 9, wherein the DF procedure comprises an adaptive DF procedure based on adaptive sampling rate associated with the intensity image.

14. A method for image processing, comprising:
   receiving an intensity image;
   generating an application programming interface (API) call for transforming the received intensity image;
   transmitting the API call to an image processing server for transforming the intensity image into a layered distance field (DF) image, wherein the layered DF image comprises an ordered sequence of multiple layers,
      wherein each layer in the ordered sequence comprises:
         a DF procedure for defining DF values at a plurality of locations of the received intensity image; and
         a set of rules for mapping the DF values to intensity values of the respective layer;
   receiving a response from the image processing server, wherein the response comprises the layered DF image, such that the layered DF image is obtained by transforming intensity image; and
   rendering the layered DF image.

* * * * *